United States Patent
al-Mohssen et al.

(10) Patent No.: US 11,327,483 B2
(45) Date of Patent: May 10, 2022

(54) IMAGE CAPTURE DEVICES FOR AUTONOMOUS MOBILE ROBOTS AND RELATED SYSTEMS AND METHODS

(71) Applicant: iRobot Corporation, Bedford, MA (US)

(72) Inventors: Husain al-Mohssen, Cambridge, MA (US); Zupei Li, Nashua, NH (US); Elena Jakubiak, Arlington, MA (US); Laura V. Herlant, Arlington, MA (US); Michael J. Halloran, Bedford, MA (US); Danielle O'Connor Dean, Westford, MA (US)

(73) Assignee: iRobot Corporation, Bedford, MA (US)

( * ) Notice: Subject to any disclaimer, the term of this patent is extended or adjusted under 35 U.S.C. 154(b) by 404 days.

(21) Appl. No.: 16/588,295

(22) Filed: Sep. 30, 2019

(65) Prior Publication Data

US 2021/0096560 A1    Apr. 1, 2021

(51) Int. Cl.
*G05D 1/00* (2006.01)
*A47L 9/28* (2006.01)
(Continued)

(52) U.S. Cl.
CPC ............ *G05D 1/0038* (2013.01); *A47L 9/009* (2013.01); *A47L 9/2826* (2013.01); *A47L 9/2852* (2013.01);
(Continued)

(58) Field of Classification Search
CPC .. G05D 1/0038; G05D 1/0214; G05D 1/0231; G05D 2201/0203;
(Continued)

(56) References Cited

U.S. PATENT DOCUMENTS

| 6,690,134 B1 * | 2/2004 | Jones .................. G05D 1/0214 318/567 |
| 8,855,914 B1 * | 10/2014 | Alexander .......... A47L 11/4036 701/400 |

(Continued)

FOREIGN PATENT DOCUMENTS

WO    WO 2018/124682    7/2018

OTHER PUBLICATIONS

PCT International Search Report and Written Opinion in International Appln. No. PCT/US2020/026192, dated Aug. 8, 2020, 12 pages.
(Continued)

*Primary Examiner* — Bhavesh V Amin
(74) *Attorney, Agent, or Firm* — Fish & Richardson P.C.

(57) ABSTRACT

An autonomous cleaning robot includes a drive system to support the autonomous cleaning robot above a floor surface, an image capture device positioned on the autonomous cleaning robot to capture imagery of a portion of the floor surface forward of the autonomous cleaning robot, and a controller operably connected to the drive system and the image capture device. The drive system is operable to maneuver the autonomous cleaning robot about the floor surface. The controller is configured to execute instructions to perform operations including initiating, based on a user-selected sensitivity and the imagery captured by the image capture device, an avoidance behavior to avoid an obstacle on the portion of the floor surface.

20 Claims, 19 Drawing Sheets

(51) Int. Cl.
    *A47L 9/00*           (2006.01)
    *A47L 11/40*         (2006.01)
    *G05D 1/02*          (2020.01)

(52) U.S. Cl.
    CPC .......... *A47L 9/2894* (2013.01); *A47L 11/4011* (2013.01); *A47L 11/4061* (2013.01); *A47L 11/4066* (2013.01); *G05D 1/0214* (2013.01); *G05D 1/0231* (2013.01); *A47L 2201/04* (2013.01); *G05D 2201/0203* (2013.01); *G05D 2201/0215* (2013.01)

(58) Field of Classification Search
    CPC .... G05D 2201/0215; G05D 1/02; G05D 1/00; A47L 9/009; A47L 9/2826; A47L 9/2852; A47L 9/2894; A47L 11/4011; A47L 11/4061; A47L 11/4066; A47L 2201/04; A47L 9/0477; A47L 9/0488; A47L 9/2857; A47L 9/28; A47L 5/12; A47L 9/00; A47L 9/04; A47L 3/00; A47L 4/00; A47L 5/00; A47L 7/00; A47L 13/00; A47L 11/00; A47L 25/00; G01S 17/08; B25J 13/08; B25J 9/00; B25J 9/16; G06F 3/01; G06T 1/00; G06T 19/00; G06T 11/00; G06T 7/00; G06T 5/00; G06T 15/00; G06T 17/00
See application file for complete search history.

(56) References Cited

U.S. PATENT DOCUMENTS

| | | | | |
|---|---|---|---|---|
| 8,903,589 | B2* | 12/2014 | Sofman | B25J 11/0085 |
| | | | | 701/23 |
| 8,996,172 | B2* | 3/2015 | Shah | G01S 17/48 |
| | | | | 700/258 |
| 9,026,302 | B2 | 5/2015 | Stout et al. | |
| 9,233,472 | B2 | 1/2016 | Angle et al. | |
| 9,375,847 | B2 | 6/2016 | Angle et al. | |
| 9,380,922 | B2 | 7/2016 | Duffley et al. | |
| 9,554,508 | B2 | 1/2017 | Balutis et al. | |
| 9,802,322 | B2 | 10/2017 | Angle et al. | |
| 9,868,211 | B2 | 1/2018 | Williams et al. | |
| 9,874,873 | B2 | 1/2018 | Angle et al. | |
| 10,100,968 | B1 | 10/2018 | Chow et al. | |
| 10,394,246 | B2* | 8/2019 | Moshkina-Martinson | A47L 9/2852 |
| 2005/0171636 | A1* | 8/2005 | Tani | G05D 1/0276 |
| | | | | 700/245 |
| 2007/0285041 | A1* | 12/2007 | Jones | G05D 1/0227 |
| | | | | 318/568.12 |
| 2008/0091305 | A1* | 4/2008 | Svendsen | A47L 9/009 |
| | | | | 700/258 |
| 2010/0063628 | A1* | 3/2010 | Landry | G05D 1/0272 |
| | | | | 700/258 |
| 2011/0202175 | A1* | 8/2011 | Romanov | B25J 5/00 |
| | | | | 700/250 |
| 2012/0125363 | A1* | 5/2012 | Kim | A47L 9/2852 |
| | | | | 134/6 |
| 2013/0146090 | A1* | 6/2013 | Ko | G05D 1/021 |
| | | | | 134/18 |
| 2014/0207280 | A1* | 7/2014 | Duffley | A47L 9/2857 |
| | | | | 700/257 |
| 2014/0207282 | A1* | 7/2014 | Angle | G05B 15/02 |
| | | | | 700/257 |
| 2016/0270619 | A1* | 9/2016 | Lu | B08B 1/001 |
| 2016/0282862 | A1 | 9/2016 | Duffley et al. | |
| 2016/0306358 | A1* | 10/2016 | Kang | G01S 17/46 |
| 2017/0049288 | A1* | 2/2017 | Knutson | A47L 11/4088 |
| 2017/0203446 | A1 | 7/2017 | Dooley et al. | |
| 2017/0225336 | A1 | 8/2017 | Deyle et al. | |
| 2017/0332869 | A1* | 11/2017 | Nam | A47L 9/0477 |
| 2018/0071918 | A1 | 3/2018 | Angle et al. | |
| 2018/0178391 | A1* | 6/2018 | Naito | G05D 1/0219 |
| 2018/0284786 | A1* | 10/2018 | Moshkina-Martinson | A47L 9/2857 |
| 2018/0284792 | A1 | 10/2018 | Kleiner et al. | |
| 2018/0304472 | A1 | 10/2018 | Angle et al. | |
| 2018/0325252 | A1* | 11/2018 | Hopke | A47L 9/009 |
| 2018/0344116 | A1* | 12/2018 | Schriesheim | A47L 9/2852 |
| 2018/0353042 | A1* | 12/2018 | Gil | G05D 1/0088 |
| 2018/0361581 | A1* | 12/2018 | Williams | A47L 11/00 |
| 2019/0032842 | A1 | 1/2019 | Chow et al. | |
| 2019/0097827 | A1 | 3/2019 | Angle et al. | |
| 2020/0375429 | A1 | 12/2020 | Munich et al. | |
| 2021/0124354 | A1 | 4/2021 | Munich et al. | |

OTHER PUBLICATIONS

U.S. Appl. No. 16/216,386, filed Dec. 11, 2018, Chow et al.
U.S. Appl. No. 16/425,658, filed May 29, 2019, Munich et al.
[No Author Listed] "Neato All-Floor Robotic Vacuum User's Guide," Neato Robotics, 2011, 174 pages.
Ecovacs.cn [online] "DN33 tips," retrieved on Jun. 17, 2019, retrieved from URL <https://www.ecovacs.cn/deebot/dn33/use-tips-4.html>.

\* cited by examiner

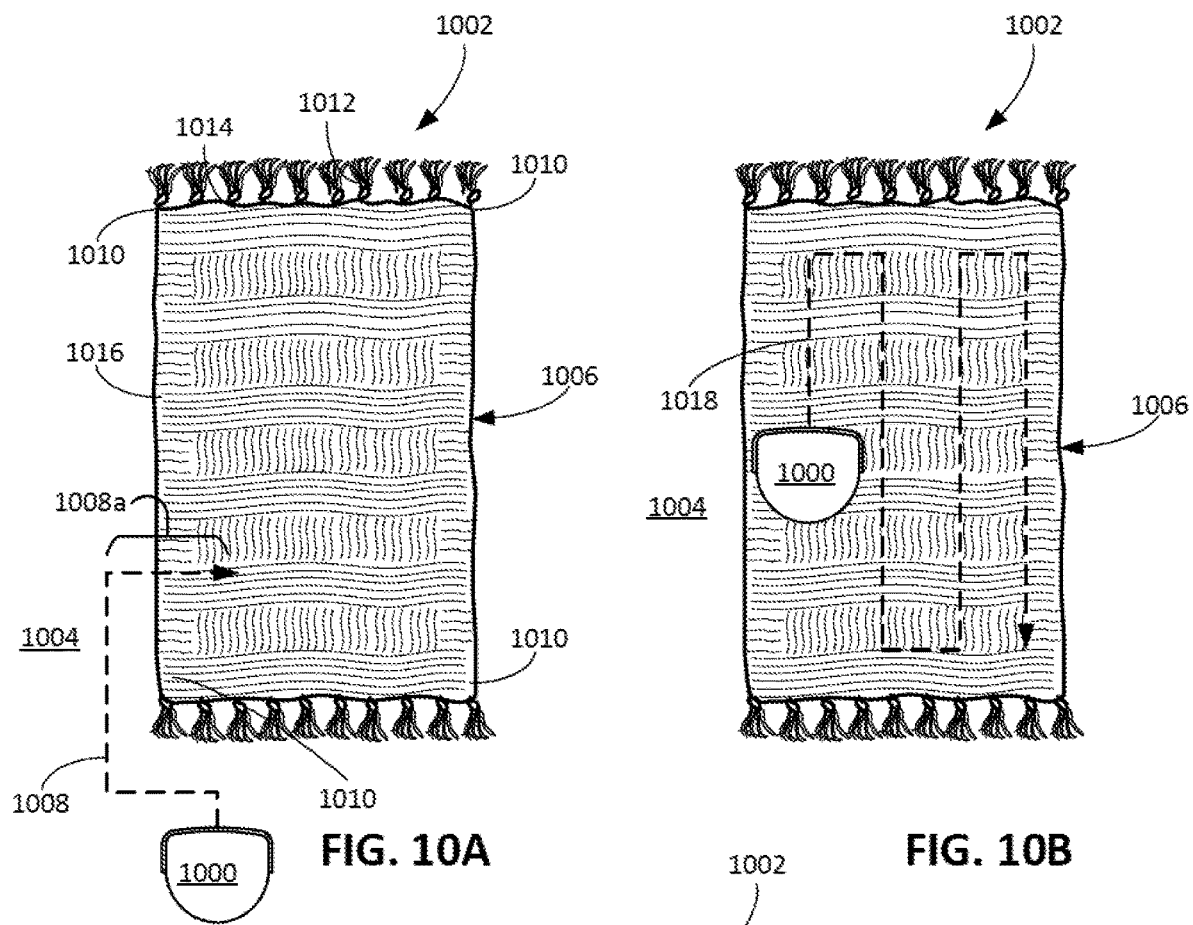
FIG. 10A
FIG. 10B
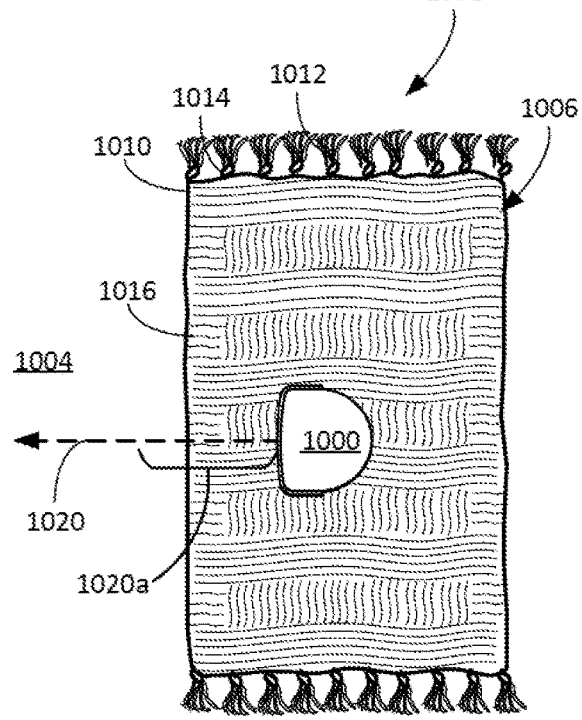
FIG. 10C

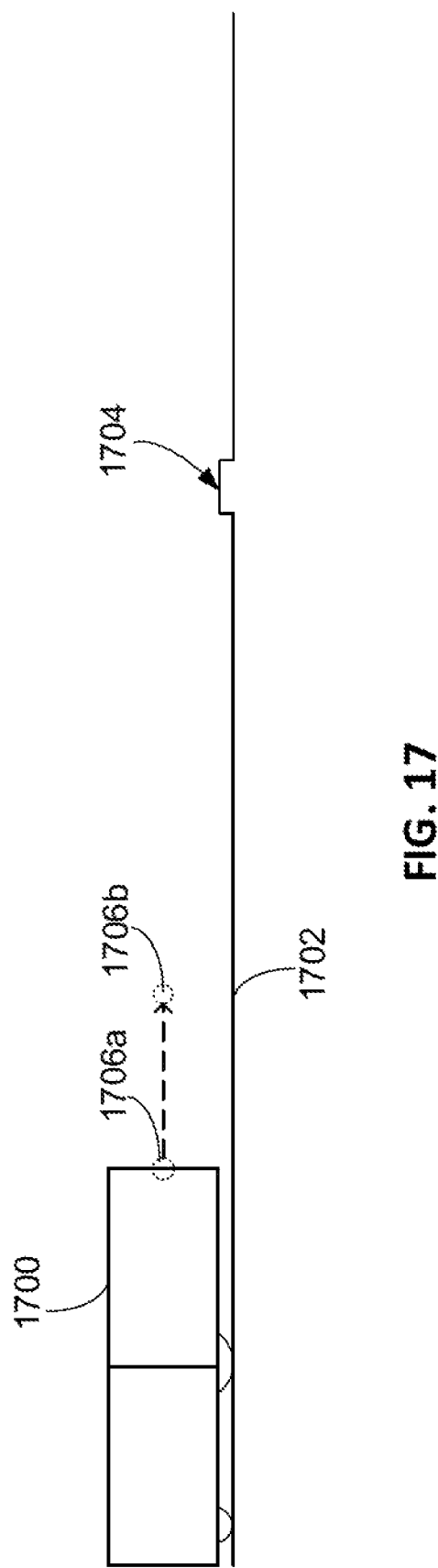

IMAGE CAPTURE DEVICES FOR AUTONOMOUS MOBILE ROBOTS AND RELATED SYSTEMS AND METHODS

TECHNICAL FIELD

This specification relates to image capture devices for autonomous mobile robots and related systems and methods.

BACKGROUND

Autonomous mobile robots include autonomous cleaning robots that autonomously perform cleaning tasks within an environment, e.g., a home. Many kinds of cleaning robots are autonomous to some degree and in different ways. A cleaning robot can include a controller configured to autonomously navigate the robot about an environment such that the robot can ingest debris as it moves. The cleaning robot can include a sensor for avoiding obstacles in the environment.

SUMMARY

An autonomous cleaning robot can include a camera facing in a forward direction of the robot. The present disclosure describes various ways that the forward facing camera can be used in operations of the robot. Based on imagery captured by the camera, the robot can behave in certain ways in response to obstacles and features ahead of the robot. For example, the camera can be used to capture imagery of the floor surface, allowing the robot to detect area rugs on the floor surface. The robot, in response to detecting an area rug on a portion of the floor surface, can initiate a behavior to move along the floor surface in a manner that reduces the risk of error as the robot moves over the portion of the floor surface with the area rug. Furthermore, the imagery captured by the camera can also be used to provide the user with information about an environment of the robot. For example, imagery captured by the camera can be used to provide a map of the environment that indicates floor types of different portions of the floor surface in the environment. The imagery can also be used to provide information about features along walls of the environment, such as windows, paintings, and the like. Moreover, the map can provide information on locations of obstacles in the environment, and the user can operate a user computing device to select a sensitivity of the robot to detection of these obstacles in the environment. When the selected sensitivity is high, the robot tends to initiate an obstacle avoidance behavior at a distance longer than the distance when the selected sensitivity is low.

Advantages of the foregoing may include, but are not limited to, those described below and herein elsewhere.

Implementations described herein can improve the experience for users in interacting with autonomous mobile robots. Imagery captured by a camera of an autonomous mobile robot can provide information to a user about an environment of the robot such that the user can make informed decisions for controlling operations of the robot. The information can be presented visually on a user computing device in the form of a representation of a map. For example, a representation of a map presented to the user can indicate a floor surface type of a portion of a floor surface in the environment. To visually represent the floor surface type, a user computing device can present at least a portion of the imagery that represents the portion of the floor surface. Alternatively, the floor surface type can be identified from the imagery, and then the user computing device can present a map that contains a representation of the floor surface type. The visual representations presented to the user through the user computing device allow the user to easily obtain information about the environment, and then use this information to control operations of the robot.

In further examples, objects in the imagery captured by the camera of the robot can be identified such that representations of these objects can be presented to the user. These representations can be presented to the user on a user computing device to allow the user to track the objects encountered by the robot during its operations in the environment. As a result, the user can easily respond to detection of certain objects in the environment, e.g., cords, clothing, or the like, by tidying up or cleaning up these objects so that the robot does not encounter them again in subsequent cleaning operations.

Implementations described herein can increase the amount of control that the user has over operations of an autonomous mobile robot. As the robot detects objects in the environment, the robot can perform obstacle avoidance behavior to avoid the objects. In this behavior, the robot can travel along the floor surface such that the robot remains a certain distance from an object as the robot avoids the object. The user, in implementations described herein, can select this distance or otherwise select a sensitivity of the robot to avoiding obstacles. Thus while the robot can autonomously perform operations in the environment, the user still has control over certain behaviors of the robot, allowing the user to control operations in a way that is suitable for the unique features of the environment in which the robot is operating. The user can control the sensitivity so that the robot can cover a greater amount of area in the environment without significantly increasing the rate that the robot experiences error conditions.

Implementations described herein can also provide an intuitive way for the user to control the operations of the robot. The user can interact with a visual representation of the environment that intuitively provides the user with information about the environment. Because the visual representation can be constructed based on imagery captured of the environment, the visual representation can better correspond with the actual visual appearance of the environment. In addition, the user interface controls for adjusting, for example, the sensitivity of the robot to detection of objects in the environment, can be intuitively operated by the user.

Implementations described herein can allow an autonomous cleaning robot to clean an area rug with a reduced risk of experiencing an error condition associated with the area rug. For example, an autonomous cleaning robot may ingest tassels of, a corner of, or other portions of the area rug when navigating over the area rug and then experience an error condition. Using imagery captured by the camera of the autonomous cleaning robot, the robot can initiate a movement pattern relative to the area rug that reduces the risk that the robot ingests a portion of the area rug.

Implementations described herein can provide autonomous mobile robots that appear more intelligent to human users as the robots travel around their environments. For example, as an autonomous mobile robot with a front-facing camera moves about its environment, the front-facing camera can see a portion of the floor surface ahead of the robot such that the robot can initiate behaviors in anticipation of objects ahead of the robot. As a result, the robot can initiate behaviors well before contacting an object or being adjacent to the object, thus providing time and physical space to respond to detection of the object by the camera. The robot can, for example, slow down or turn relative to the object, and thus provide the appearance that the robot is intelligently responding to the object.

In one aspect, a mobile computing device includes a user input device, and a controller operably connected to the user input device. The controller is configured to execute instructions to perform operations including receiving, from the user input device, data indicative of a user-selected sensitivity for obstacle avoidance by an autonomous cleaning robot, and initiating transmission of the data indicative of the user-selected sensitivity to the autonomous cleaning robot such that the autonomous cleaning robot initiates an obstacle avoidance behavior to avoid an obstacle on a portion of a floor surface based on imagery captured by an image capture device of the autonomous cleaning robot and the user-selected sensitivity.

In another aspect, an autonomous cleaning robot includes a drive system to support the autonomous cleaning robot above a floor surface, an image capture device positioned on the autonomous cleaning robot to capture imagery of a portion of the floor surface forward of the autonomous cleaning robot, and a controller operably connected to the drive system and the image capture device. The drive system is operable to maneuver the autonomous cleaning robot about the floor surface. The controller is configured to execute instructions to perform operations including initiating, based on a user-selected sensitivity and the imagery captured by the image capture device, an avoidance behavior to avoid an obstacle on the portion of the floor surface.

In a further aspect, a method includes capturing, by an image capture device on an autonomous cleaning robot, imagery of a portion of a floor surface forward of the autonomous cleaning robot, the portion of the floor surface including at least a portion of a rug, and maneuvering the autonomous cleaning robot onto the rug along a path selected based on the imagery of the portion of the floor surface.

In a further aspect, an autonomous cleaning robot includes a drive system to support the autonomous cleaning robot above a floor surface, an image capture device positioned on the autonomous cleaning robot to capture imagery of a portion of the floor surface forward of the autonomous cleaning robot, and a controller operably connected to the drive system and the image capture device. The drive system is operable to maneuver the autonomous cleaning robot about the floor surface. The portion of the floor surface includes at least a portion of a rug. The controller is configured to execute instructions to perform operations including maneuvering the autonomous cleaning robot onto the rug along a path selected based on the imagery of the portion of the floor surface.

In a further aspect, an autonomous cleaning robot includes a drive system to support the autonomous cleaning robot above a floor surface, an image capture device positioned on the autonomous cleaning robot to capture imagery of a portion of the floor surface forward of the autonomous cleaning robot, and a controller operably connected to the drive system and the image capture device. The drive system is operable to maneuver the autonomous cleaning robot about the floor surface. The controller is configured to execute instructions to perform operations including maneuvering the autonomous cleaning robot at a first speed along a first portion of the floor surface toward a second portion of the floor surface, detecting the second portion of the floor surface based on the imagery captured by the image capture device, and maneuvering the autonomous cleaning robot at a second speed along the first portion of the floor surface toward the second portion of the floor surface after detecting the second portion of the floor surface. The second portion of the floor surface has a lower elevation than the first portion of the floor surface. The second speed is less than the first speed.

In a further aspect, an autonomous cleaning robot includes a drive system to support the autonomous cleaning robot above a floor surface, and a controller operably connected to the drive system. The drive system is operable to maneuver the autonomous cleaning robot about the floor surface. The controller is configured to execute instructions to perform operations including maneuvering the autonomous cleaning robot at a first speed along a first portion of the floor surface toward a second portion of the floor surface, and after the autonomous cleaning robot is within a distance from the second portion of the floor surface, maneuvering the autonomous cleaning robot at a second speed along the first portion of the floor surface based on the autonomous mobile. The second portion of the floor surface has a lower elevation than the first portion of the floor surface. The second speed is less than the first speed.

In a further aspect, a method includes maneuvering an autonomous cleaning robot at a first speed along a first portion of a floor surface toward a second portion of the floor surface, detecting, using an image capture device positioned on the autonomous cleaning robot to capture imagery of a portion of the floor surface forward of the autonomous cleaning robot, the second portion of the floor surface, and maneuvering the autonomous cleaning robot at a second speed along the first portion of the floor surface toward the second portion of the floor surface after detecting the second portion of the floor surface. The second portion of the floor surface has a lower elevation than the first portion of the floor surface. The second speed is less than the first speed.

Implementations can include one or more features below or described herein elsewhere. Implementations can include combinations of the below features.

In some implementations, the user-selected sensitivity can be indicative of a distance threshold such that the autonomous cleaning robot initiates the obstacle avoidance behavior based on a distance between the obstacle and the autonomous cleaning robot being no more than the distance threshold. In some implementations, receiving the user-selected sensitivity can include receiving data indicative of a user selection of the distance threshold.

In some implementations, the user-selected sensitivity is indicative of a likelihood threshold such that the autonomous cleaning robot initiates the obstacle avoidance behavior based on a likelihood of a presence of the obstacle on the portion of the floor surface being no less than the likelihood threshold. In some implementations, the likelihood of the presence of the obstacle can be determined based on the imagery captured by the image capture device.

In some implementations, the mobile computing device can further include a display operably connected to the controller. The obstacle can be represented in the imagery captured by the image capture device. The operations can include receiving, from the autonomous cleaning robot, data representative of the imagery, and presenting, on the display, a representation of the obstacle based on the data representative of the imagery.

In some implementations, the mobile computing device can include a display operably connected to the controller. The operations can include presenting, on the display, representations of obstacles present in imagery by the image capture device of the autonomous cleaning robot, the representations of the obstacles including a representation of the obstacle.

In some implementations, the user-selected sensitivity can correspond to a user-selected distance threshold, and initiating the avoidance behavior to avoid the obstacle can include initiating the avoidance behavior based on a distance between the obstacle and the autonomous cleaning robot being no more than the distance threshold.

In some implementations, the user-selected sensitivity can correspond to a likelihood threshold, and initiating the avoidance behavior to avoid the obstacle can include initiating the avoidance behavior based on a likelihood of a presence of the obstacle on the portion of the floor surface being no less than the likelihood threshold.

In some implementations, the operations can include initiating transmission of data indicative of images captured by the image capture device to cause a remote user device to present representations of obstacles present in the images.

In some implementations, the imagery of the portion of the floor surface can be indicative of a location of a tassel of the rug, and maneuvering the autonomous cleaning robot onto the rug can include maneuvering the autonomous cleaning robot onto the rug along the path such that the autonomous cleaning robot avoids the tassel.

In some implementations, the path can be a first path. The imagery of the portion of the floor surface can be indicative of a direction along which a tassel of the rug extends along the floor surface. The operations can further include maneuvering the autonomous cleaning robot off of the rug along a second path such that the autonomous cleaning robot moves over the tassel in a direction substantially parallel to the direction along which the tassel extends.

In some implementations, the imagery of the portion of the floor surface can be indicative of a location of a corner of the rug. Maneuvering the autonomous cleaning robot onto the rug can include maneuvering the autonomous cleaning robot onto the rug along the path such that the autonomous cleaning robot avoids the corner of the rug.

In some implementations, the imagery can include images. Maneuvering the autonomous cleaning robot onto the rug along a path selected based on the imagery of the portion of the floor surface can include maneuvering the autonomous cleaning robot onto the rug along the path selected based on a location of an edge of the rug represented in the plurality of images. In some implementations, maneuvering the autonomous cleaning robot onto the rug along the path selected based on the location of the edge of the rug represented in the plurality of images can include maneuvering the autonomous cleaning robot onto the rug along the path selected based on a stitched image representation of the floor surface generated from the plurality of images. In some implementations, the autonomous cleaning robot can include a rotatable member on a bottom portion of the autonomous cleaning robot, and a motor to rotate the rotatable member to direct debris into an interior of the autonomous cleaning robot. The operations can further include operating the motor to rotate the rotatable member at a first speed of rotation as the autonomous cleaning robot moves about a portion of the floor surface off of the rug, and operating the motor to rotate the rotatable member at a second speed of rotation as the cleaning robot moves from the portion of the floor surface off of the rug to a portion of the floor surface on the rug. The second speed of rotation can be less than the first speed of rotation. In some implementations, the second speed of rotation is zero. In some implementations, the operations can further include operating the motor to rotate the rotatable member at third speed of rotation as the cleaning robot moves about the rug, and operating the motor to rotate the rotatable member at a fourth speed of rotation as the cleaning robot moves from the portion of the floor surface on the rug to the portion of the floor surface on the rug. The third speed of rotation can be greater than the second speed of rotation. The fourth speed of rotation can be greater than the second speed of rotation.

In some implementations, maneuvering the autonomous cleaning robot at the second speed along the first portion of the floor surface after detecting the second portion of the floor surface can include initiating reduction of a speed from the autonomous cleaning robot from the first speed to the second speed based on determining, from the imagery captured by the image capture device, the autonomous cleaning robot is no more than a distance from the second portion of the floor surface. In some implementations, the distance can be between 50% to 300% of a length of the autonomous cleaning robot.

In some implementations, the imagery captured by the image capture device can represent at least a portion of the second portion of the floor surface.

In some implementations, the autonomous cleaning robot can include a single image capture device corresponding to the image capture device.

In some implementations, the image capture device can be directed at an angle between 10 and 30 degrees above the floor surface. In some implementations, a horizontal field of view of the image capture device can be between 90 and 150 degrees.

In some implementations, the autonomous cleaning robot can include a cliff sensor disposed on a bottom portion of the autonomous cleaning robot. The cliff sensor can be configured to detect the second portion of the floor surface as the bottom portion of the autonomous cleaning robot moves over the second portion of the floor surface. In some implementations, the operations can include maneuvering the autonomous cleaning robot along the first portion of the floor surface away from the second portion of the floor surface as the cliff sensor detects the second portion of the floor surface.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIGS. 10A-10C are top views of an autonomous cleaning robot in an environment with an area rug.

FIG. 17 is a side view of an autonomous cleaning robot approaching a raised portion of a floor surface.

Like reference numbers and designations in the various drawings indicate like elements.

DETAILED DESCRIPTION

An autonomous mobile robot can be controlled to move about a floor surface in an environment. In some implementations, the robot can be equipped with a camera that enables the robot to capture imagery of a portion of the floor surface ahead of the robot. As described herein, this imagery, alone or in combination with other sensor data produced by the robot, can be used to create rich, detailed user-facing representations of maps, and can also be used for controlling navigation of the robot relative to objects on the floor surface.

Example Autonomous Mobile Robots

Figure 1:
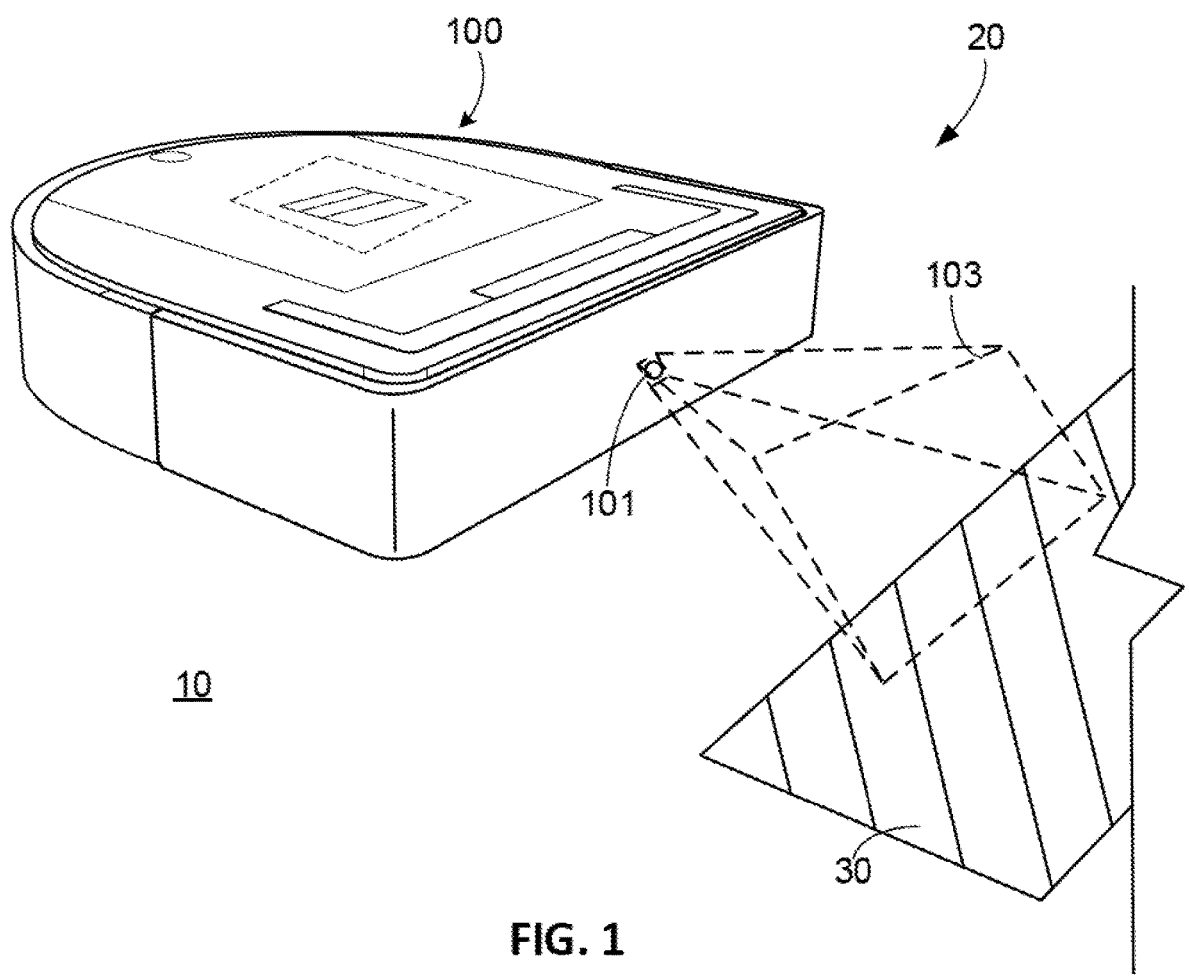
FIG. 1 is a perspective view of an autonomous cleaning robot in an environment.

Referring to FIG. 1, an autonomous mobile robot, e.g., an autonomous cleaning robot, 100 on a floor surface 10 in an environment 20, e.g., a home, includes an image capture device 101 configured to capture imagery of the environment 20. In particular, the image capture device 101 is positioned on a forward portion 122 of the robot 100. A field of view 103 of the image capture device 101 covers at least a portion of the floor surface 10 ahead of the robot 100. The image capture device 101 can capture imagery of an object on the portion of the floor surface 10.

For example, as depicted in FIG. 1, the image capture device 101 can capture imagery representing at least a portion of a rug 30 on the floor surface 10. The imagery can be used by the robot 100 for navigating about the environment 20 and can, in particular, be used by the robot 100 to navigate relative to the rug 30 so that the robot 100 avoids error conditions that can potentially be triggered as the robot 100 moves over the rug 30.

Figure 2:
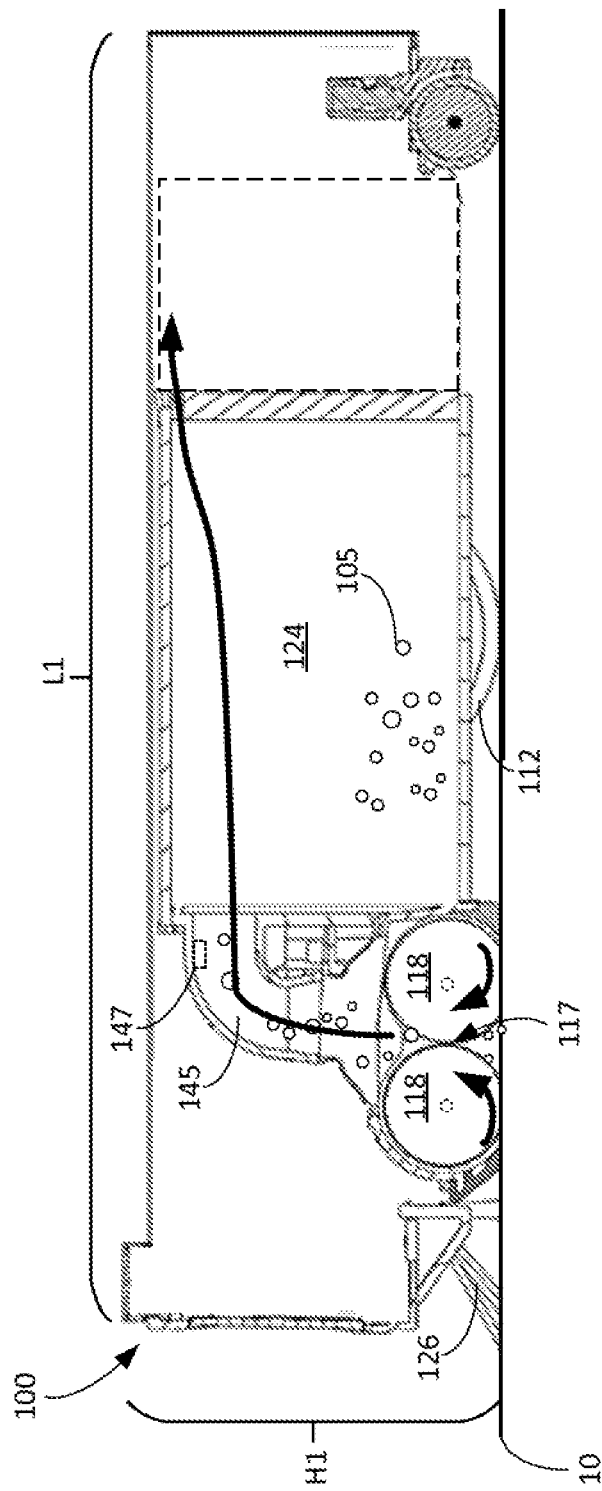
FIG. 2 is a side schematic view of an autonomous cleaning robot in an environment.
Figure 3A:
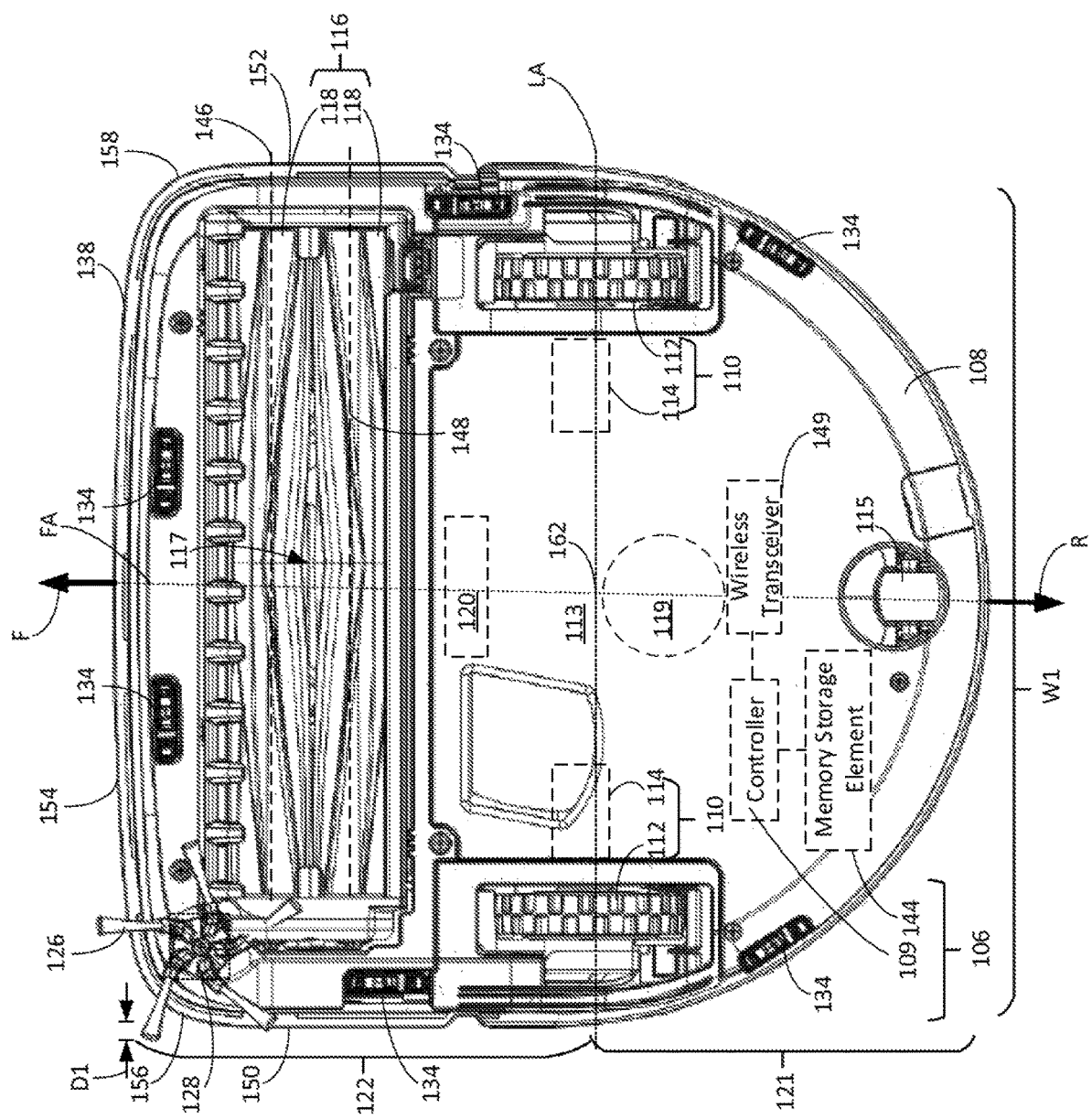
FIG. 3A is a bottom view of an autonomous cleaning robot.
Figure 3B:
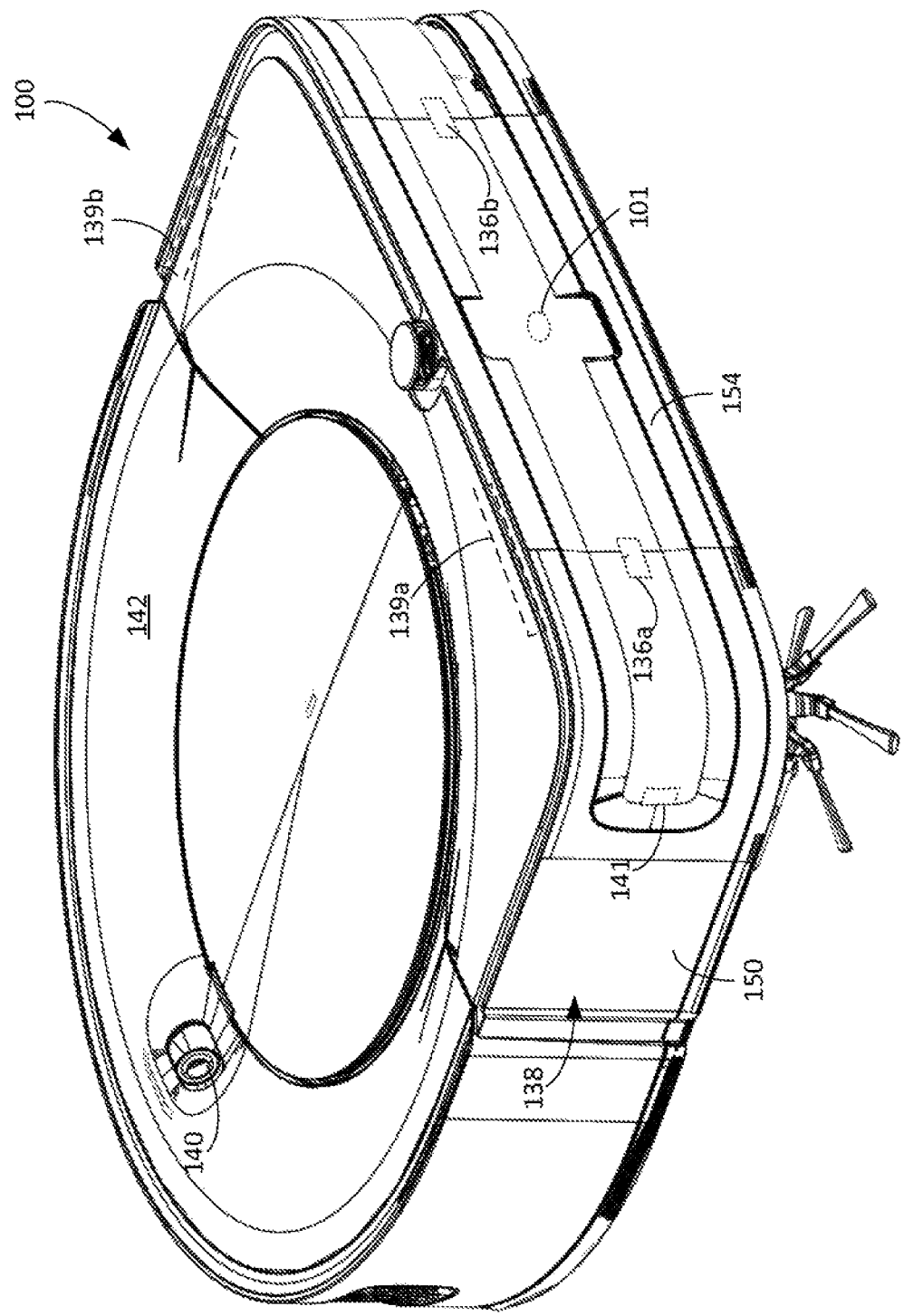
FIG. 3B is a top perspective view of the robot of FIG. 3A.

FIGS. 2 and 3A-3B depict an example of the robot 100. Referring to FIG. 2, the robot 100 collects debris 105 from the floor surface 10 as the robot 100 traverses the floor surface 10. The robot 100 is usable to perform one or more cleaning missions in the environment 20 (shown in FIG. 1?) to clean the floor surface 10. A user can provide a command to the robot 100 to initiate a cleaning mission. For example, the user can provide a start command that causes the robot 100 to initiate the cleaning mission upon receiving the start command. In another example, the user can provide a schedule that causes the robot 100 to initiate a cleaning mission at a scheduled time indicated in the schedule. The schedule can include multiple scheduled times at which the robot 100 initiates cleaning missions. In some implementations, between a start and an end of a single cleaning mission, the robot 100 may cease the cleaning mission to charge the robot 100, e.g., to charge an energy storage unit of the robot 100. The robot 100 can then resume the cleaning mission after the robot 100 is sufficiently charged. The robot 100 can charge itself at a docking station. In some implementations, the docking station can, in addition to charging the robot 100, evacuate debris from the robot 100 when the robot 100 is docked at the docking station.

Referring to FIG. 3A, the robot 100 includes a housing infrastructure 108. The housing infrastructure 108 can define the structural periphery of the robot 100. In some examples, the housing infrastructure 108 includes a chassis, cover, bottom plate, and bumper assembly. The robot 100 is a household robot that has a small profile so that the robot 100 can fit under furniture within a home. For example, a height H1 (shown in FIG. 2) of the robot 100 relative to the floor surface can be no more than 13 centimeters. The robot 100 is also compact. An overall length L1 (shown in FIG. 2) of the robot 100 and an overall width W1 (shown in FIG. 3A) are each between 30 and 60 centimeters, e.g., between 30 and 40 centimeters, 40 and 50 centimeters, or 50 and 60 centimeters. The overall width W1 can correspond to a width of the housing infrastructure 108 of the robot 100.

The robot 100 includes a drive system 110 including one or more drive wheels. The drive system 110 further includes one or more electric motors including electrically driven portions forming part of the electrical circuitry 106. The housing infrastructure 108 supports the electrical circuitry 106, including at least a controller 109, within the robot 100.

The drive system 110 is operable to propel the robot 100 across the floor surface 10. The robot 100 can be propelled in a forward drive direction F or a rearward drive direction R. The robot 100 can also be propelled such that the robot 100 turns in place or turns while moving in the forward drive direction F or the rearward drive direction R. In the example depicted in FIG. 3A, the robot 100 includes drive wheels 112 extending through a bottom portion 113 of the housing infrastructure 108. The drive wheels 112 are rotated by motors 114 to cause movement of the robot 100 along the floor surface 10. The robot 100 further includes a passive caster wheel 115 extending through the bottom portion 113 of the housing infrastructure 108. The caster wheel 115 is not powered. Together, the drive wheels 112 and the caster wheel 115 cooperate to support the housing infrastructure 108 above the floor surface 10. For example, the caster wheel 115 is disposed along a rearward portion 121 of the housing infrastructure 108, and the drive wheels 112 are disposed forward of the caster wheel 115.

Referring to FIG. 3B, the robot 100 includes a forward portion 122 that is substantially rectangular and a rearward portion 121 that is substantially semicircular. The forward portion 122 includes side surfaces 150, 152, a forward surface 154, and corner surfaces 156, 158. The corner surfaces 156, 158 of the forward portion 122 connect the side surface 150, 152 to the forward surface 154.

In the example depicted in FIGS. 2, 3A, and 3B, the robot 100 is an autonomous mobile floor cleaning robot that includes a cleaning assembly 116 (shown in FIG. 3A) operable to clean the floor surface 10. For example, the robot 100 is a vacuum cleaning robot in which the cleaning assembly 116 is operable to clean the floor surface 10 by ingesting debris 105 (shown in FIG. 2) from the floor surface 10. The cleaning assembly 116 includes a cleaning inlet 117 through which debris is collected by the robot 100. The cleaning inlet 117 is positioned forward of a center of the robot 100, e.g., a center 162, and along the forward portion 122 of the robot 100 between the side surfaces 150, 152 of the forward portion 122.

The cleaning assembly 116 includes one or more rotatable members driven by a drive system, e.g., rotatable members 118 driven by a motor 120. The rotatable members 118 extend horizontally across the forward portion 122 of the robot 100. The rotatable members 118 are positioned along a forward portion 122 of the housing infrastructure 108, and extend along 75% to 95% of a width of the forward portion 122 of the housing infrastructure 108, e.g., corresponding to an overall width W1 of the robot 100. Referring also to FIG. 2, the cleaning inlet 117 is positioned between the rotatable members 118.

The rotatable members 118 are on a bottom portion of the robot 100, and are configured to rotate to direct debris into an interior of the robot 100, e.g., into a debris bin 124 (shown in FIG. 2). As shown in FIG. 2, the rotatable members 118 are rollers that counter-rotate relative to one another. For example, the rotatable members 118 can be rotatable about parallel horizontal axes 146, 148 (shown in FIG. 3A) to agitate debris 105 on the floor surface 10 and direct the debris 105 toward the cleaning inlet 117, into the cleaning inlet 117, and into a suction pathway 145 (shown in FIG. 2) in the robot 100. Referring back to FIG. 3A, the rotatable members 118 can be positioned entirely within the forward portion 122 of the robot 100. The rotatable members 118 include elastomeric shells that contact debris 105 on the floor surface 10 to direct debris 105 through the cleaning inlet 117 between the rotatable members 118 and into an interior of the robot 100, e.g., into the debris bin 124 (shown in FIG. 2), as the rotatable members 118 rotate relative to the housing infrastructure 108. The rotatable members 118 further contact the floor surface 10 to agitate debris 105 on the floor surface 10.

The robot 100 further includes a vacuum system 119 operable to generate an airflow through the cleaning inlet 117 between the rotatable members 118 and into the debris bin 124. The vacuum system 119 includes an impeller and a motor to rotate the impeller to generate the airflow. The vacuum system 119 cooperates with the cleaning assembly 116 to draw debris 105 from the floor surface 10 into the debris bin 124. In some cases, the airflow generated by the vacuum system 119 creates sufficient force to draw debris 105 on the floor surface 10 upward through the gap between the rotatable members 118 into the debris bin 124. In some cases, the rotatable members 118 contact the floor surface 10 to agitate the debris 105 on the floor surface 10, thereby allowing the debris 105 to be more easily ingested by the airflow generated by the vacuum system 119.

The robot 100 further includes a brush 126 that rotates about a non-horizontal axis, e.g., an axis forming an angle between 75 degrees and 90 degrees with the floor surface 10. The non-horizontal axis, for example, forms an angle between 75 degrees and 90 degrees with the longitudinal axes of the rotatable members 118. The robot 100 includes a motor 128 operably connected to the brush 126 to rotate the brush 126.

The brush 126 is a side brush laterally offset from a fore-aft axis FA of the robot 100 such that the brush 126 extends beyond an outer perimeter of the housing infrastructure 108 of the robot 100. For example, the brush 126 can extend beyond one of the side surfaces 150, 152 of the robot 100 and can thereby be capable of engaging debris on portions of the floor surface 10 that the rotatable members 118 typically cannot reach, e.g., portions of the floor surface 10 outside of a portion of the floor surface 10 directly underneath the robot 100. The brush 126 is also forwardly offset from a lateral axis LA of the robot 100 such that the brush 126 also extends beyond the forward surface 154 of the housing infrastructure 108. As depicted in FIG. 3A, the brush 126 extends beyond the side surface 150, the corner surface 156, and the forward surface 154 of the housing infrastructure 108. In some implementations, a horizontal distance D1 that the brush 126 extends beyond the side surface 150 is at least, for example, 0.2 centimeters, e.g., at least 0.25 centimeters, at least 0.3 centimeters, at least 0.4 centimeters, at least 0.5 centimeters, at least 1 centimeter, or more. The brush 126 is positioned to contact the floor surface 10 during its rotation so that the brush 126 can easily engage the debris 105 on the floor surface 10.

The brush 126 is rotatable about the non-horizontal axis in a manner that brushes debris on the floor surface 10 into a cleaning path of the cleaning assembly 116 as the robot 100 moves. For example, in examples in which the robot 100 is moving in the forward drive direction F, the brush 126 is rotatable in a clockwise direction (when viewed from a perspective above the robot 100) such that debris that the brush 126 contacts moves toward the cleaning assembly and toward a portion of the floor surface 10 in front of the cleaning assembly 116 in the forward drive direction F. As a result, as the robot 100 moves in the forward drive direction F, the cleaning inlet 117 of the robot 100 can collect the debris swept by the brush 126. In examples in which the robot 100 is moving in the rearward drive direction R, the brush 126 is rotatable in a counterclockwise direction (when viewed from a perspective above the robot 100) such that debris that the brush 126 contacts moves toward a portion of the floor surface 10 behind the cleaning assembly 116 in the rearward drive direction R. As a result, as the robot 100 moves in the rearward drive direction R, the cleaning inlet 117 of the robot 100 can collect the debris swept by the brush 126.

The electrical circuitry 106 includes, in addition to the controller 109, a memory storage element 144 and a sensor system with one or more electrical sensors, for example. The sensor system, as described herein, can generate a signal indicative of a current location of the robot 100, and can generate signals indicative of locations of the robot 100 as the robot 100 travels along the floor surface 10. The controller 109 is configured to execute instructions to perform one or more operations as described herein. The memory storage element 144 is accessible by the controller 109 and disposed within the housing infrastructure 108. The one or more electrical sensors are configured to detect features in an environment 20 of the robot 100. For example, referring to FIG. 3A, the sensor system includes cliff sensors 134 disposed along the bottom portion 113 of the housing infrastructure 108. Each of the cliff sensors 134 is an optical sensor that can detect the presence or the absence of an object below the optical sensor, such as the floor surface 10.

The cliff sensors 134 can thus detect obstacles such as drop-offs and cliffs below portions of the robot 100 where the cliff sensors 134 are disposed and redirect the robot accordingly.

The robot 100 can further include a wireless transceiver 149 (shown in FIG. 3A). The wireless transceiver 149 allows the robot 100 to wirelessly communicate data with a communication network (e.g., the communication network 185 described herein with respect to FIG. 5). The robot 100 can receive or transmit data using the wireless transceiver 149, and can, for example, receive data representative of a map and transmit data representative of mapping data collected by the robot 100.

Referring to FIG. 3B, the sensor system includes one or more proximity sensors that can detect objects along the floor surface 10 that are near the robot 100. For example, the sensor system can include proximity sensors 136a, 136b disposed proximate the forward surface 154 of the housing infrastructure 108. Each of the proximity sensors 136a, 136b includes an optical sensor facing outward from the forward surface 154 of the housing infrastructure 108 and that can detect the presence or the absence of an object in front of the optical sensor. For example, the detectable objects include obstacles such as furniture, walls, persons, and other objects in the environment 20 of the robot 100.

The sensor system includes a bumper system including the bumper 138 and one or more bump sensors that detect contact between the bumper 138 and obstacles in the environment 20. The bumper 138 forms part of the housing infrastructure 108. For example, the bumper 138 can form the side surfaces 150, 152 as well as the forward surface 154. The sensor system, for example, can include the bump sensors 139a, 139b. The bump sensors 139a, 139b can include break beam sensors, capacitive sensors, or other sensors that can detect contact between the robot 100, e.g., the bumper 138, and objects in the environment 20. In some implementations, the bump sensor 139a can be used to detect movement of the bumper 138 along the fore-aft axis FA (shown in FIG. 3A) of the robot 100, and the bump sensor 139b can be used to detect movement of the bumper 138 along the lateral axis LA (shown in FIG. 3A) of the robot 100. The proximity sensors 136a, 136b can detect objects before the robot 100 contacts the objects, and the bump sensors 139a, 139b can detect objects that contact the bumper 138, e.g., in response to the robot 100 contacting the objects.

The sensor system includes one or more obstacle following sensors. For example, the robot 100 can include an obstacle following sensor 141 along the side surface 150. The obstacle following sensor 141 includes an optical sensor facing outward from the side surface 150 of the housing infrastructure 108 and that can detect the presence or the absence of an object adjacent to the side surface 150 of the housing infrastructure 108. The obstacle following sensor 141 can emit an optical beam horizontally in a direction perpendicular to the forward drive direction F of the robot 100 and perpendicular to the side surface 150 of the robot 100. For example, the detectable objects include obstacles such as furniture, walls, persons, and other objects in the environment 20 of the robot 100. In some implementations, the sensor system can include an obstacle following sensor along the side surface 152, and the obstacle following sensor can detect the presence or the absence of an object adjacent to the side surface 152. The obstacle following sensor 141 along the side surface 150 is a right obstacle following sensor, and the obstacle following sensor along the side surface 152 is a left obstacle following sensor. The one or more obstacle following sensors, including the obstacle following sensor 141, can also serve as obstacle avoidance sensors, e.g., similar to the proximity sensors described herein. In this regard, the left obstacle following can be used to determine a distance between an object, e.g., an obstacle surface, to the left of the robot 100 and the robot 100, and the right obstacle following sensor can be used to determine a distance between an object, e.g., an obstacle surface, to the right of the robot 100 and the robot 100.

In some implementations, at least some of the proximity sensors 136a, 136b and the obstacle following sensor 141 each include an optical emitter and an optical detector. The optical emitter emits an optical beam outward from the robot 100, e.g., outward in a horizontal direction, and the optical detector detects a reflection of the optical beam that reflects off an object near the robot 100. The robot 100, e.g., using the controller 109, can determine a time of flight of the optical beam and thereby determine a distance between the optical detector and the object, and hence a distance between the robot 100 and the object.

The sensor system further includes an image capture device 140, e.g., a camera, directed toward a top portion 142 of the housing infrastructure 108. The image capture device 140 generates digital imagery of the environment 20 of the robot 100 as the robot 100 moves about the floor surface 10. The image capture device 140 is angled in an upward direction, e.g., angled between 30 degrees and 80 degrees from the floor surface 10 about which the robot 100 navigates. The camera, when angled upward, can capture images of wall surfaces of the environment 20 so that features corresponding to objects on the wall surfaces can be used for localization.

When the controller 109 causes the robot 100 to perform the mission, the controller 109 operates the motors 114 to drive the drive wheels 112 and propel the robot 100 along the floor surface 10. In addition, the controller 109 operates the motor 120 to cause the rotatable members 118 to rotate, operates the motor 128 to cause the brush 126 to rotate, and operates the motor of the vacuum system 119 to generate the airflow. To cause the robot 100 to perform various navigational and cleaning behaviors, the controller 109 executes software stored on the memory storage element 144 to cause the robot 100 to perform by operating the various motors of the robot 100. The controller 109 operates the various motors of the robot 100 to cause the robot 100 to perform the behaviors.

The sensor system can further include sensors for tracking a distance traveled by the robot 100. For example, the sensor system can include encoders associated with the motors 114 for the drive wheels 112, and these encoders can track a distance that the robot 100 has traveled. In some implementations, the sensor system includes an optical sensor facing downward toward a floor surface. The optical sensor can be an optical mouse sensor. For example, the optical sensor can be positioned to direct light through a bottom surface of the robot 100 toward the floor surface 10. The optical sensor can detect reflections of the light and can detect a distance traveled by the robot 100 based on changes in floor features as the robot 100 travels along the floor surface 10.

The controller 109 uses data collected by the sensors of the sensor system to control navigational behaviors of the robot 100 during the mission. For example, the controller 109 uses the sensor data collected by obstacle avoidance sensors of the robot 100, e.g., the cliff sensors 134, the proximity sensors 136a, 136b and the bump sensors 139a, 139b, to enable the robot 100 to avoid obstacles within the environment 20 of the robot 100 during the mission.

The sensor data can be used by the controller 109 for simultaneous localization and mapping (SLAM) techniques in which the controller 109 extracts features of the environment 20 represented by the sensor data and constructs a map of the floor surface 10 of the environment 20. The sensor data collected by the image capture device 140 can be used for techniques such as vision-based SLAM (VSLAM) in which the controller 109 extracts visual features corresponding to objects in the environment 20 and constructs the map using these visual features. As the controller 109 directs the robot 100 about the floor surface 10 during the mission, the controller 109 uses SLAM techniques to determine a location of the robot 100 within the map by detecting features represented in collected sensor data and comparing the features to previously-stored features. The map formed from the sensor data can indicate locations of traversable and nontraversable space within the environment 20. For example, locations of obstacles are indicated on the map as nontraversable space, and locations of open floor space are indicated on the map as traversable space.

The sensor data collected by any of the sensors can be stored in the memory storage element 144. In addition, other data generated for the SLAM techniques, including mapping data forming the map, can be stored in the memory storage element 144. These data produced during the mission can include persistent data that are produced during the mission and that are usable during a further mission. For example, the mission can be a first mission, and the further mission can be a second mission occurring after the first mission. In addition to storing the software for causing the robot 100 to perform its behaviors, the memory storage element 144 stores sensor data or data resulting from processing of the sensor data for access by the controller 109 from one mission to another mission. For example, the map is a persistent map that is usable and updateable by the controller 109 of the robot 100 from one mission to another mission to navigate the robot 100 about the floor surface 10.

The persistent data, including the persistent map, enable the robot 100 to efficiently clean the floor surface 10. For example, the persistent map enables the controller 109 to direct the robot 100 toward open floor space and to avoid nontraversable space. In addition, for subsequent missions, the controller 109 is able to plan navigation of the robot 100 through the environment 20 using the persistent map to optimize paths taken during the missions.

The sensor system can further include a debris detection sensor 147 that can detect debris on the floor surface 10 of the environment 20. The debris detection sensor 147 can be used to detect portions of the floor surface 10 in the environment 20 that are dirtier than other portions of the floor surface 10 in the environment 20. In some implementations, the debris detection sensor 147 (shown in FIG. 2) is capable of detecting an amount of debris, or a rate of debris, passing through the suction pathway 145. The debris detection sensor 147 can be an optical sensor configured to detect debris as it passes through the suction pathway 145. Alternatively, the debris detection sensor 147 can be a piezoelectric sensor that detects debris as the debris impacts a wall of the suction pathway 145. In some implementations, the debris detection sensor 147 detects debris before the debris is ingested by the robot 100 into the suction pathway 145. The debris detection sensor 147 can be, for example, an image capture device that captures images of a portion of the floor surface 10 ahead of the robot 100. The controller 109 can then use these images to detect the presence of debris on this portion of the floor surface 10.

The sensor system can further include the image capture device 101 (shown in FIG. 3B). In some implementations, the sensor system includes a single image capture device corresponding to the image capture device 101. In other words, in some implementations, the sensor system does not include the image capture device 140 but includes the image capture device 101. In implementations in which the sensor system includes a single image capture device corresponding to the image capture device 101, the imagery captured by the image capture device 101 can also be used for the functions described with respect to the image capture device 140. For example, the image capture device 101 can capture images of wall surfaces of the environment 20 so that features corresponding to objects on the wall surfaces can be used for localization.

Figure 4:
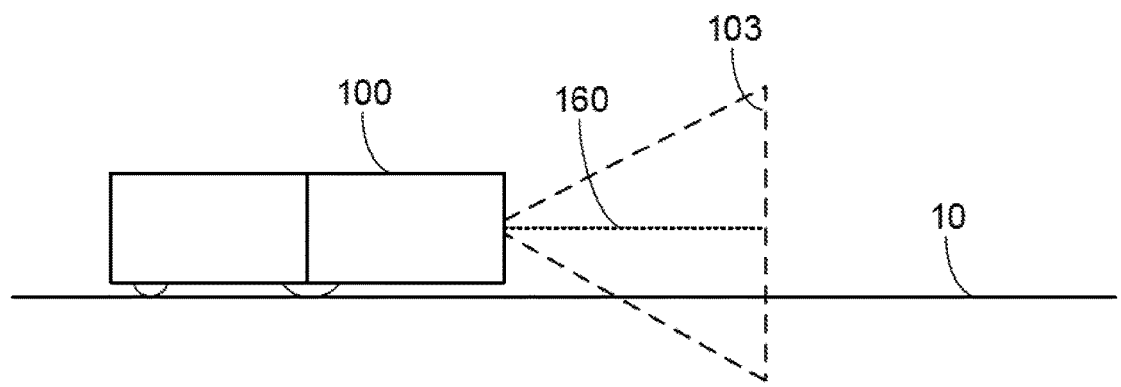
FIG. 4 is a side schematic view of an autonomous cleaning robot with an image capture device in an environment.

The image capture device 101 is positioned on the forward portion 122 of the robot 100 and is directed to capture imagery of at least a portion of the floor surface 10 forward of the robot 100. In particular, the image capture device 101 can be directed in a forward direction F (shown in FIG. 3A) of the robot 100. The image capture device 101 can be, for example, a camera or an optical sensor. Referring to FIG. 4, the field of view 103 of the image capture device 101 extends laterally and vertically. A center 160 of the field of view 103 can be, for example, 5 to 45 degrees above the horizon or above the floor surface 10, e.g., between 10 and 30 degrees, 10 and 40 degrees, 15 and 35 degrees, or 20 and 30 degrees above the horizon or above the floor surface 10. A horizontal angle of view of the field of view 103 can be between 90 and 150 degrees, e.g., between 100 and 140 degrees, 110 and 130 degrees, or 115 and 125 degrees. A vertical angle of view of the field of view 103 can be between 60 and 120 degrees, e.g., between 70 and 110 degrees, 80 and 100 degrees, 85 and 95 degrees. The imagery can represent portions of the floor surface 10 as well as other portions of the environment 20 above the floor surface 10. For example, the imagery can represent portions of wall surfaces and obstacles in the environment 20 above the floor surface 10. As described herein, the image capture device 101 can generate imagery for producing representations of maps of the environment 20 and for controlling navigation of the robot 100 about obstacles.

Example Communication Networks

Figure 5:
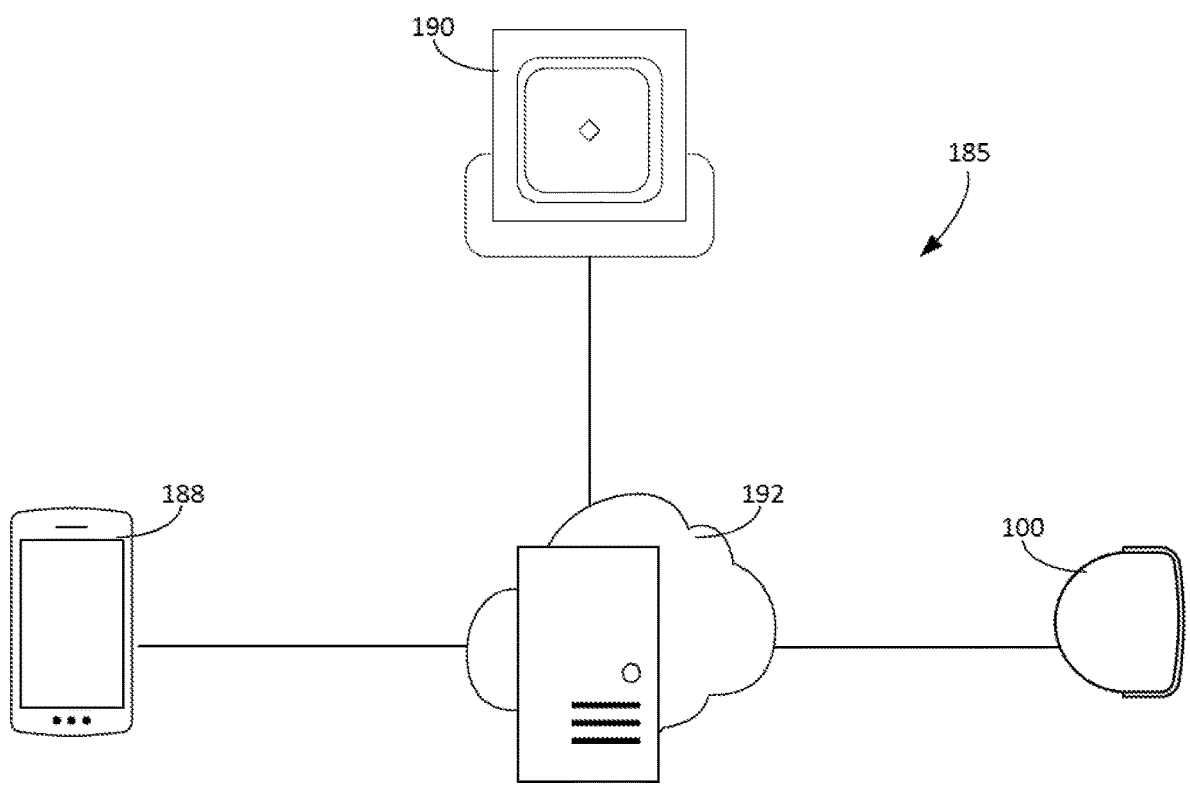
FIG. 5 is a diagram of a communications network.

Referring to FIG. 5, an example communication network 185 is shown. Nodes of the communication network 185 include the robot 100, a mobile device 188, an autonomous mobile robot 190, and a cloud computing system 192. Using the communication network 185, the robot 100, the mobile device 188, the robot 190, and the cloud computing system 192 can communicate with one another to transmit data to one another and receive data from one another. In some implementations, the robot 100, the robot 190, or both the robot 100 and the robot 190 communicate with the mobile device 188 through the cloud computing system 192. Alternatively or additionally, the robot 100, the robot 190, or both the robot 100 and the robot 190 communicate directly with the mobile device 188. Various types and combinations of wireless networks (e.g., Bluetooth, radio frequency, optical based, etc.) and network architectures (e.g., mesh networks) may be employed by the communication network 185.

In some implementations, the mobile device 188 as shown in FIG. 5 is a remote device that can be linked to the cloud computing system 192 and can enable the user to provide inputs on the mobile device 188. The mobile device 188 can include user input elements such as, for example, one or more of a touchscreen display, buttons, a microphone, a mouse, a keyboard, or other devices that respond to inputs provided by the user. The mobile device 188 alternatively or additionally includes immersive media (e.g., virtual reality) with which the user interacts to provide a user input. The mobile device 188, in these cases, is, for example, a virtual reality headset or a head-mounted display. The user can provide inputs corresponding to commands for the mobile robot 100. In such cases, the mobile device 188 transmits a signal to the cloud computing system 192 to cause the cloud computing system 192 to transmit a command signal to the mobile robot 100. In some implementations, the mobile device 188 can present augmented reality images. In some implementations, the mobile device 188 is a smartphone, a laptop computer, a tablet computing device, or other mobile device.

In some implementations, the communication network 185 can include additional nodes. For example, nodes of the communication network 185 can include additional robots. Alternatively or additionally, nodes of the communication network 185 can include network-connected devices. In some implementations, a network-connected device can generate information about the environment 20. The network-connected device can include one or more sensors to detect features in the environment 20, such as an acoustic sensor, an image capture system, or other sensor generating signals from which features can be extracted. Network-connected devices can include home cameras, smart sensors, and the like.

In the communication network 185 depicted in FIG. 5 and in other implementations of the communication network 185, the wireless links may utilize various communication schemes, protocols, etc., such as, for example, Bluetooth classes, Wi-Fi, Bluetooth-low-energy, also known as BLE, 802.15.4, Worldwide Interoperability for Microwave Access (WiMAX), an infrared channel or satellite band. In some cases, the wireless links include any cellular network standards used to communicate among mobile devices, including, but not limited to, standards that qualify as 1G, 2G, 3G, or 4G. The network standards, if utilized, qualify as, for example, one or more generations of mobile telecommunication standards by fulfilling a specification or standards such as the specifications maintained by International Telecommunication Union. The 3G standards, if utilized, correspond to, for example, the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA.

Example Methods

Example methods are described below. These methods can be used to produce user-facing representations of maps and for navigating an autonomous mobile robot in an environment. These methods can use imagery generated by a front-facing image capture device of an autonomous mobile robot, e.g., the image capture device 101 of the robot 100.

The robot 100 can be controlled in certain manners in accordance with processes described herein. While some operations of these processes may be described as being performed by the robot 100, by a user, by a computing device, or by another actor, these operations may, in some implementations, be performed by actors other than those described. For example, an operation performed by the robot 100 can be, in some implementations, performed by the cloud computing system 192 or by another computing device (or devices). In other examples, an operation performed by the user can be performed by a computing device. In some implementations, the cloud computing system 192 does not perform any operations. Rather, other computing devices perform the operations described as being performed by the cloud computing system 192, and these computing devices can be in direct (or indirect) communication with one another and the robot 100. And in some implementations, the robot 100 can perform, in addition to the operations described as being performed by the robot 100, the operations described as being performed by the cloud computing system 192 or the mobile device 188. Other variations are possible. Furthermore, while the methods, processes, and operations described herein are described as including certain operations or sub-operations, in other implementations, one or more of these operation or sub-operations may be omitted, or additional operations or sub-operations may be added.

Figure 6:
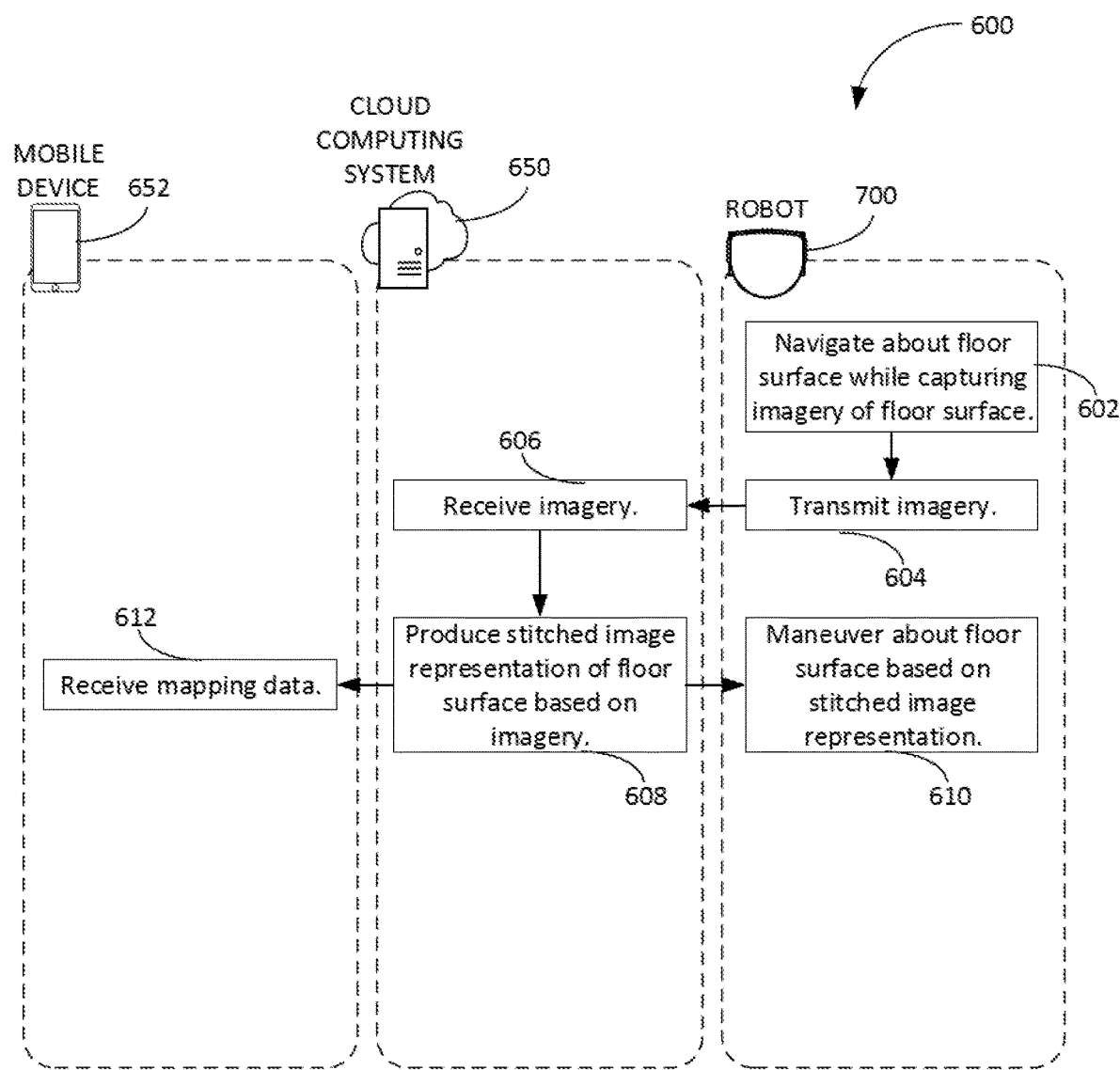
FIG. 6 is a flowchart of a method of producing a map of an environment.
Figure 7A:
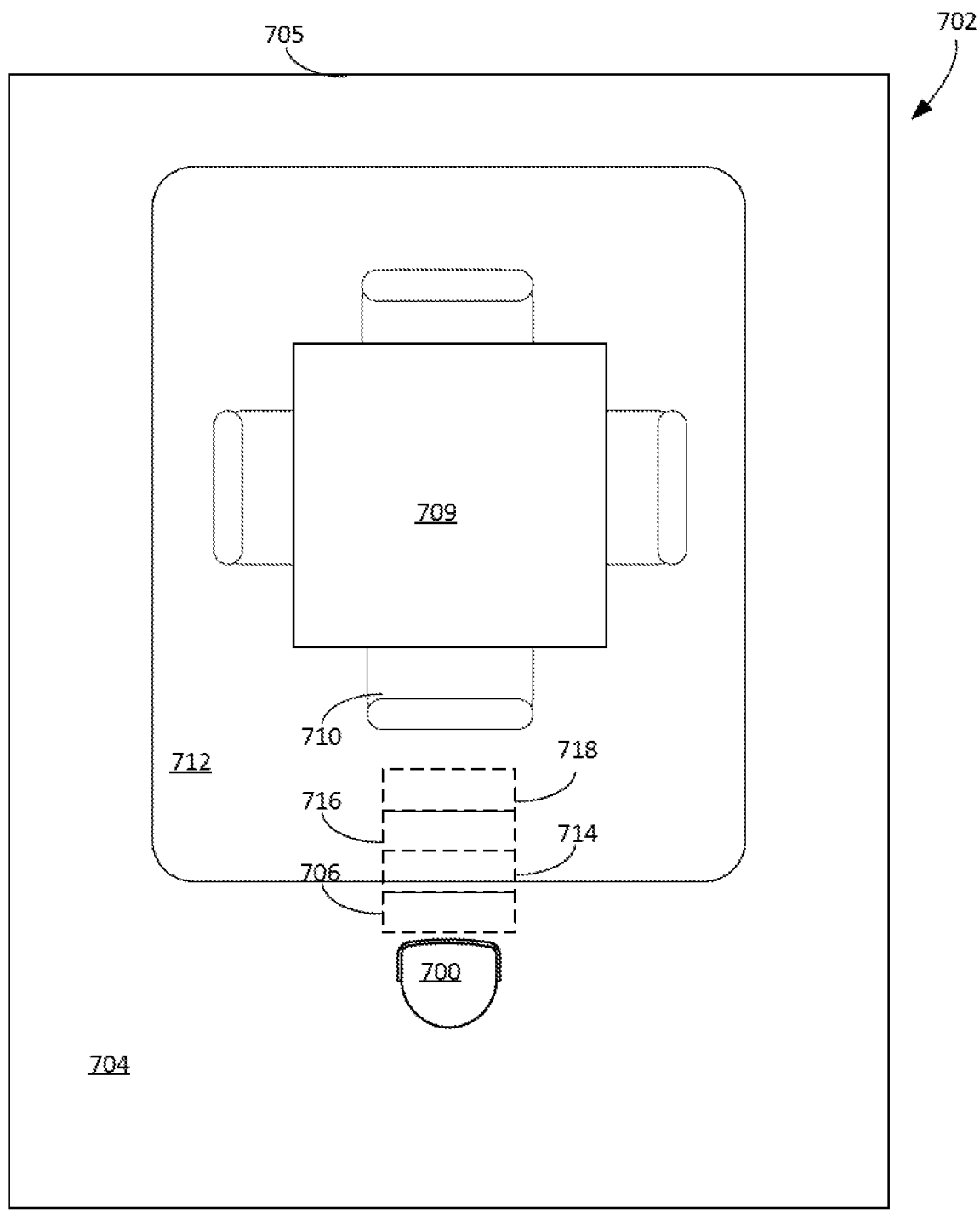
FIG. 7A is a top view of an autonomous cleaning robot in an environment.

Referring to FIG. 6, a method 600 is used for presenting a representation of a map of an environment, e.g., the environment 20, on a user-operable device, and for navigating an autonomous mobile robot, e.g., the robot 100, based on the map. The method 600 can include steps 602, 604, 606, 608, 610, 612. The method 600 and its steps are described with respect to a robot 700 shown in FIG. 7A. The robot 700 is an autonomous cleaning robot similar to the robot 100, but in other implementations, other robots described herein may be used. A representation of a map of an environment 702 of the robot 700 can include a stitched image representation of a floor surface 704 of the environment 702, with the stitched imagery representation being generated by imagery captured by an image capture device of the robot 700 (e.g., similar to the image capture device 101 described in connection with the robot 100).

At the step 602, the robot 700 navigates about the floor surface 704 while capturing imagery of the floor surface 704, e.g., using the image capture device. As described herein, the imagery captured by the image capture device can represent at least a portion of the floor surface 704. The robot 700, as described herein, can navigate using sensor data provided by a sensor system of the robot 700, including imagery from the image capture device of the robot 700. The robot 700 can navigate about the floor surface 704 during a cleaning mission. For example, the robot 700 can perform a vacuuming mission to operate a vacuum system of the robot 700 to vacuum debris on a floor surface of the environment 702.

At the step 604, the robot 700 transmits the imagery captured by its image capture device to a cloud computing system 650, e.g., similar to the cloud computing system 192 described in connection with FIG. 5. The imagery can be transmitted during a mission performed by the robot 100. Alternatively, the imagery can be transmitted at the end of the mission. At the step 606, the cloud computing system 650 receives the imagery from the robot 100.

At the step 608, a stitched image representation of the floor surface 704 is produced based on the imagery obtained from the robot 700. The stitched image representation corresponds to a top view of the floor surface 704 that is produced from imagery captured by the image capture device of the robot 700, which is arranged to have a viewing direction parallel to the floor surface 704. As described herein, the image capture device 101 of the robot 100 (similar to the image capture device of the robot 700) is directed horizontally. As a result, imagery that is captured by the image capture device 101 represents a perspective view, from the side and from above, of the floor surface 10. In some implementations, the stitched image representation of the floor surface 704 is produced by the robot 700. The cloud computing system 650 can, in some cases, serve to store a copy of the stitched image representation, and to provide a communication channel between the mobile device 652 and the robot 700.

Images representing perspective views of a floor surface can be stitched together to form a top view of the floor surface. Referring to the example depicted in FIG. 7A, in some implementations, because of the angle at which the image capture device of the robot 700 captures imagery of the floor surface 704, only part of an image captured by the image capture device can be used to form the top view of the floor surface 704. Multiple images captured by the image capture device can be stitched together to form a top view of the floor surface 704 in the environment 702. The images can represent perspective views of different portions of the floor surface 704 and can be combined to form a top view representation of a larger portion of the floor surface 704. For example, a first image can represent a perspective view of a first portion of the floor surface 704, and a second image can represent a perspective view of a second portion of the floor surface 704. The portions of the floor surface 704 represented in the first and second images can overlap. For example, the first portion of the floor surface 704 and the second portion of the floor surface 704 can each include the same portion of the floor surface 704.

Because the image capture device of the robot 700 is directed in the forward direction and has a perspective view of the floor surface 704, the imagery produced by the image capture device can represent a perspective view of a portion 706 of the floor surface 704 in the environment 702 that extends from a position in front of the robot 100 up until an obstacle that occludes a view of the image capture device, such as a wall 705 in front of the robot 100. In this regard, the image capture device can, as described herein, detect objects and features forward of the robot 700.

Figure 7B:
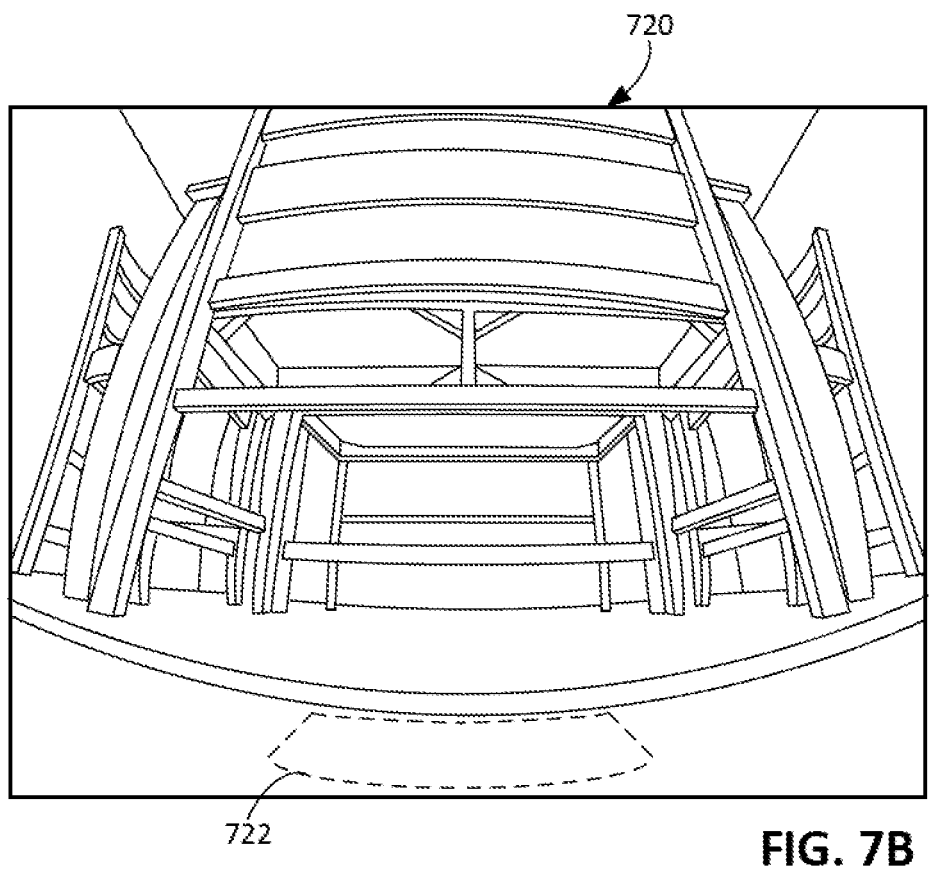
FIGS. 7B and 7C illustrate an image captured by the autonomous cleaning robot of FIG. 7A and a processed version of the image, respectively.
Figure 7C:
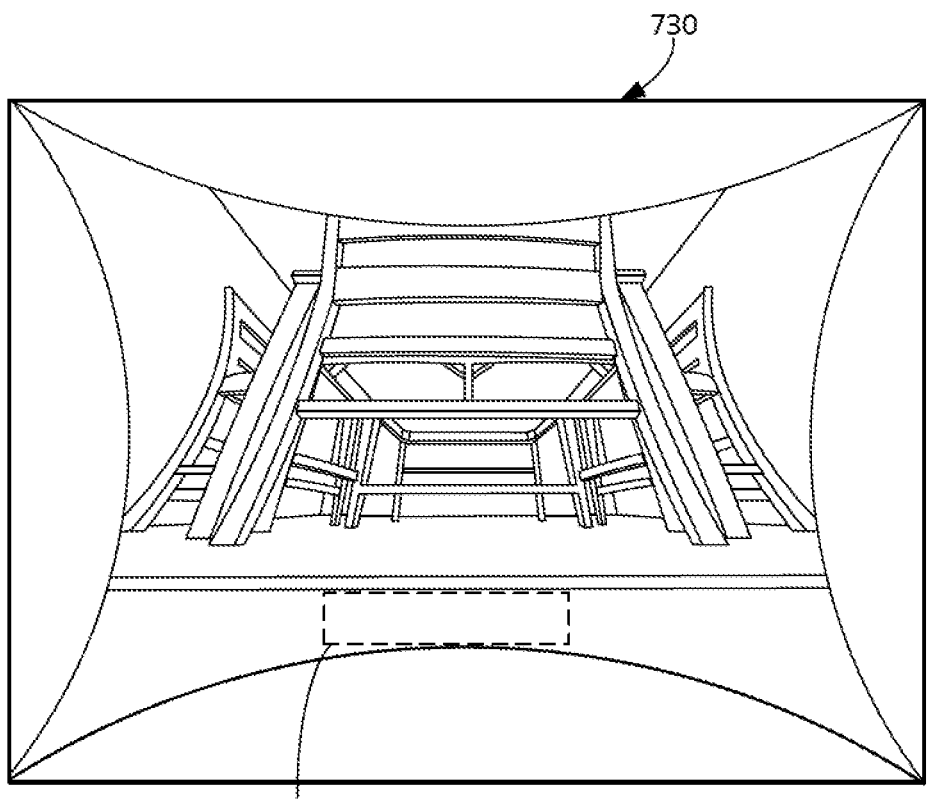

While the portion 706 of the floor surface 704 represented in an image can be large because of the perspective view of the image capture device of the robot 700, only a smaller portion of the image is usable to form the top view of the floor surface 704. FIG. 7B shows an example of an image 720 captured by the robot 700 in the environment 702. The image 720 represents the floor surface 704, as well as a table 709, a chair 710, and a rug 712 in the environment 702 (shown in FIG. 7A). The image 720 represents the portion 706 of the floor surface 704. The image 720 can be the originally captured image of the environment 702. In this regard, the image 720 can be distorted due to the image capture device having a wide field of view. FIG. 7C shows an example of an image 730 produced from the image 720 through post-processing techniques to reduce distortion in an image. The image 730 presents an undistorted view of the environment 702. The image 730 can be used to form the stitched image representation of the floor surface 704. Only a portion 732 of the image 730 is usable to form this stitched image representation. The usable portion 732 corresponds to a portion 706 of the floor surface 704 (shown in FIG. 7A) in front of the robot 100. Furthermore, the usable portion 732 corresponds to a portion 722 of the image 720 that is processed to form the usable portion 732. The portion of the image 720 can be thin, e.g., three centimeters, two centimeters, one centimeter, one millimeter, or less. The portion of the image 720 can have a width of a few pixels, e.g., 10 pixels, 8 pixels, 6 pixels, 4 pixels, 2 pixels, or fewer. Because of the angle at which the image capture device 101 is directed in the environment 20, e.g., directed along an axis parallel to the floor surface 10, the image 720 and hence the processed image 730 provide a perspective view of the floor surface 704. By only using a portion of the image 720 and the image 730, i.e., the usable portion 732 and the usable portion 722, for the stitched image representation, the stitched image representation can be representative of a top view of the floor surface 704. Referring back to FIG. 7A, as the robot 700 advances along the floor surface 704, the robot 700 captures imagery of different portions of the floor surface 704, including the portion 706, and portions 714, 716, 718. Images representing these portions 706, 714, 716, 718 can be stitched together to form the stitched image representation of a top view of the floor surface 704.

Referring back to FIG. 6, after the step 608 in which the stitched image representation of the floor surface 704 is produced based on the imagery, at the step 610, the stitched image representation can be used for navigating the robot 700 or for presenting a representation of the floor surface 704 to a user. For example, at the step 610, the robot 700 maneuvers about the floor surface 704 based on the stitched image representation. The stitched image representation can be used in combination with sensor data collected by the robot 700 as the robot 700 moves about the floor surface 704.

In some examples in which the robot 700 navigates about the floor surface 704 using the stitched image representation, the robot 700 can use the stitched image representation for determining locations of obstacles and objects on the floor surface 704. For example, the robot 700 could use the stitched image representation for determining locations of the wall 705, the table 707, the chair 710, and the rug 712. Based on the locations of these objects, the robot 700 can select navigational behaviors to navigate relative to these objects.

Figure 8A:
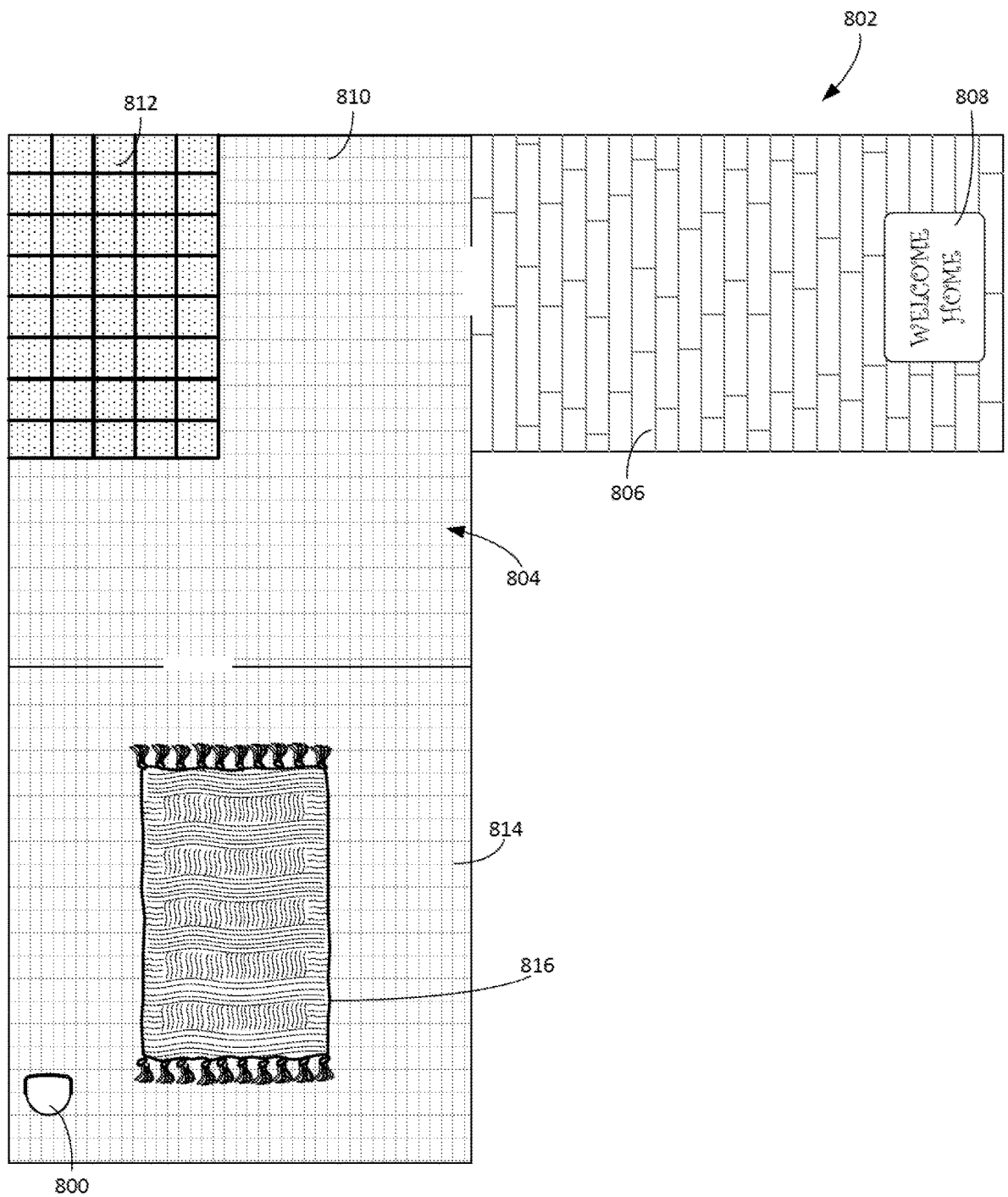
FIG. 8A is a top view of an autonomous cleaning robot in an environment.

Referring to the example of FIG. 8A, an autonomous cleaning robot 800 moves about an environment 802. The environment 802 includes multiple floor surface types. For example, a floor surface 804 includes a portion 806 having a first floor type, a portion 808 having a second floor type, a portion 810 having a third floor type, and a portion 812 having a fourth floor type, a portion 814 have the third floor type, and a portion 816 having a fifth floor type. In the example depicted in FIG. 8A, the first floor type is a hardwood surface, the second floor type is a mat surface, the third floor type is a carpet surface, the fourth floor type is a tile surface, and the fifth floor type is a rug surface. In other implementations, the floor types can vary.

Figure 8B:
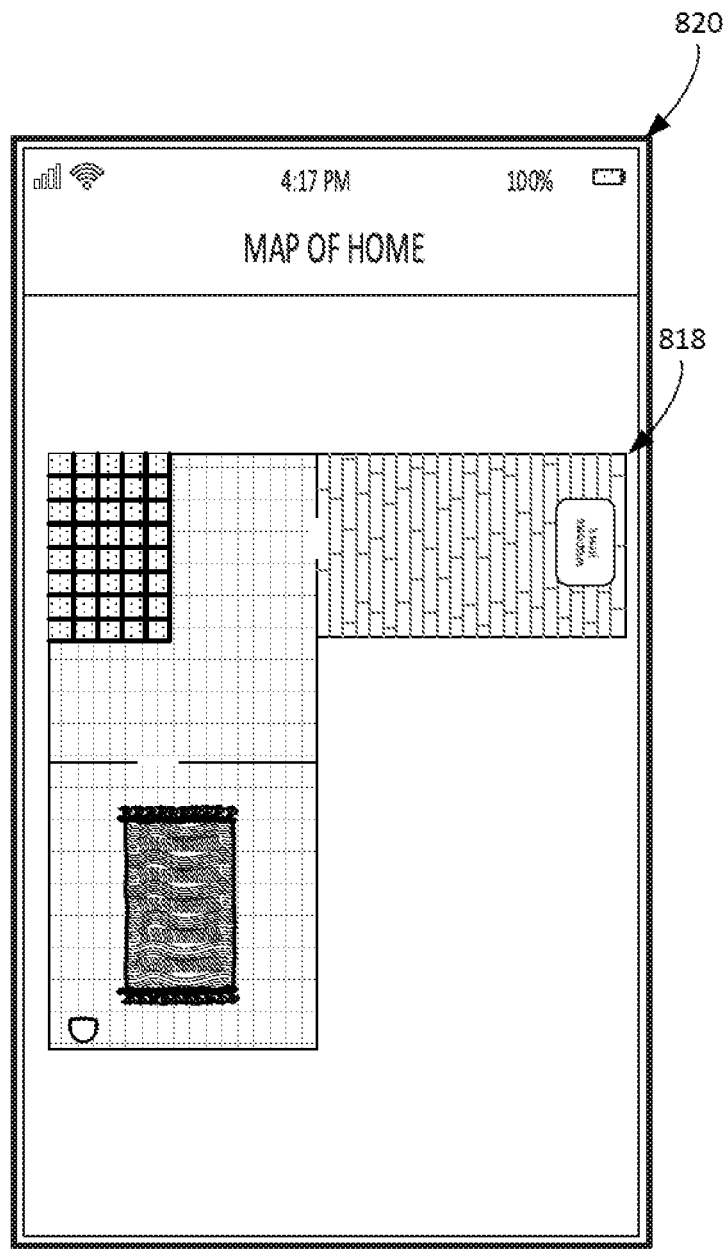
FIG. 8B is a front view of a user computing device presenting a stitched image representation of the environment of FIG. 8A.

A stitched image representation can be formed in accordance with examples described with respect to FIG. 6. For example, the robot 800 can be similar to the robot 700, and capture imagery usable to form the stitched image representation. FIG. 8B illustrates an example of a stitched image representation 818 that can be formed using imagery captured by the robot 800. The stitched image representation 818 can be presented on a mobile device 820 (e.g., similar to the mobile device 652 described herein). The stitched image representation 818 includes information indicative of the floor surface types of the various portions of the environment 802. As described herein, the information in the stitched image representation 818 can correspond to processed imagery captured by the robot 800. Alternatively or additionally, the stitched image representation 818 can include computer generated images that represent the floor surface. The information indicative of the floor surface types in the environment 802 can serve as reference points for a user to determine what the stitched image representation 818 is depicting. For example, the user can use the floor surface types to distinguish between different rooms in the environment 802, and thus can easily determine a location of the robot 800 in the environment 802 based on a location of an indicator 822 of the location of the robot 800 overlaid on the stitched image representation 818.

Other objects can be identified from the stitched image representation. Examples of navigation of autonomous cleaning robots relative to area rugs are described herein with respect to at least FIGS. 9 and 10A-10C. In further examples, obstacles that would, for example, trigger obstacle avoidance behavior of the robot 700, can include cords, chairs, bedframes, and desks. The objects can further include debris on the floor surface 10. For example, the imagery can represent debris on a portion of the floor surface 10 that can be cleaned by the robot 700 by maneuvering over the portion of the floor surface 10.

In some implementations, the stitched image representation can be transmitted to other autonomous mobile robots that operate in the environment 702. The other autonomous mobile robots can use the stitched image representation for navigating about the environment 702. In some implementations, the stitched image representation can be used in combination with sensor data collected by these other autonomous mobile robots. These other autonomous mobile robots can include one or more autonomous cleaning robots, e.g., a vacuum cleaning robot, a mopping robot, or other autonomous cleaning robots. In some implementations, an object represented in the stitched image representation can correspond to an obstacle for the robot 700 but can correspond to debris that is cleanable by another autonomous cleaning robot. For example, if the robot 700 is a vacuum cleaning robot, and another autonomous cleaning robot operating in the environment 702 is a mopping cleaning robot, a puddle in the environment 702 can correspond to an obstacle for the robot 700 and can correspond to cleanable debris for the other autonomous cleaning robot. Other autonomous mobile robots are possible. For example, the autonomous mobile robots can include one or more autonomous patrol robots.

In some implementations, at the step 612, a representation of the stitched image representation of the floor surface 704 is presented to the user. For example, a mobile device 652, e.g., similar to the mobile device 188, can present the representation of the stitched image representation, thereby providing the user with a top view representation of the floor surface 704. The top view representation can correspond to the stitched image representation and can indicate the floor types through the portions of the imagery that represent the floor surface 704. Alternatively, floor types can be identified from the stitched image representation, and the mobile device 652 can present indicators (e.g., images/textures/backgrounds) based on these floor types. In some implementations, for privacy, the representation presented on the mobile device 652 can include stock images or computer-generated images indicative of the identified floor types to indicate the floor types.

The stitched image representation of the floor surface 704 can be presented with a representation of other objects and features in the environment 20. For example, as described herein, indicators of obstacles on the floor surface 704 can be overlaid on the stitched image representation of the floor surface 704. For example, referring briefly back to the example of FIG. 7A, the mobile device 652 could present indicators of the table 709, the chair 710, and the rug 712. Because the imagery captured by the robot 700 is captured using a horizontally-directed camera, the imagery can also represent portions of walls in the environment 20. Referring briefly back to the example of FIG. 7A, the mobile device 652 could present indicators of the wall 705 and objects on the wall 705, such as windows, paintings, photographs, and other objects on the wall 705. The user can interact with the mobile device 652 to switch between different views of the environment 20. For example, the stitched image representation can be presented to show the top view representation of the floor surface 704. The user can interact with the mobile device 652 to switch to a side view in the environment 20 in which the mobile device 652 presents a representation of walls in the environment 20. The side view can also be produced using the imagery captured by the image capture device 101 of the robot 700. These different views can include the top view representation of the floor surface 704 as well as the side view representations of the environment 20, and these views can be combined for presenting a three-dimensional representation of the environment 20. This three-dimensional representation can represent both the floor surface 704 (a horizontal plane) and walls in the environment (vertical planes). This representation can be formed from multiple images captured by the robot 700 at different locations in the environment 20. These images, because they are captured are different locations in the environment 20, can provide a stereoscopic view of a portion of the environment 20.

Objects and obstacles represented in these images as described herein can be overlaid on this three-dimensional representation, thereby accurately depicting placement of doors and windows in the environment 20. Alternatively or additionally, machine learning techniques can be used to detect distances of objects from the robot 700 that appear in a single image captured by the robot 700. Based on these distances, a three-dimensional representation can be generated to be presented to the user on the mobile device 652.

Figure 9:
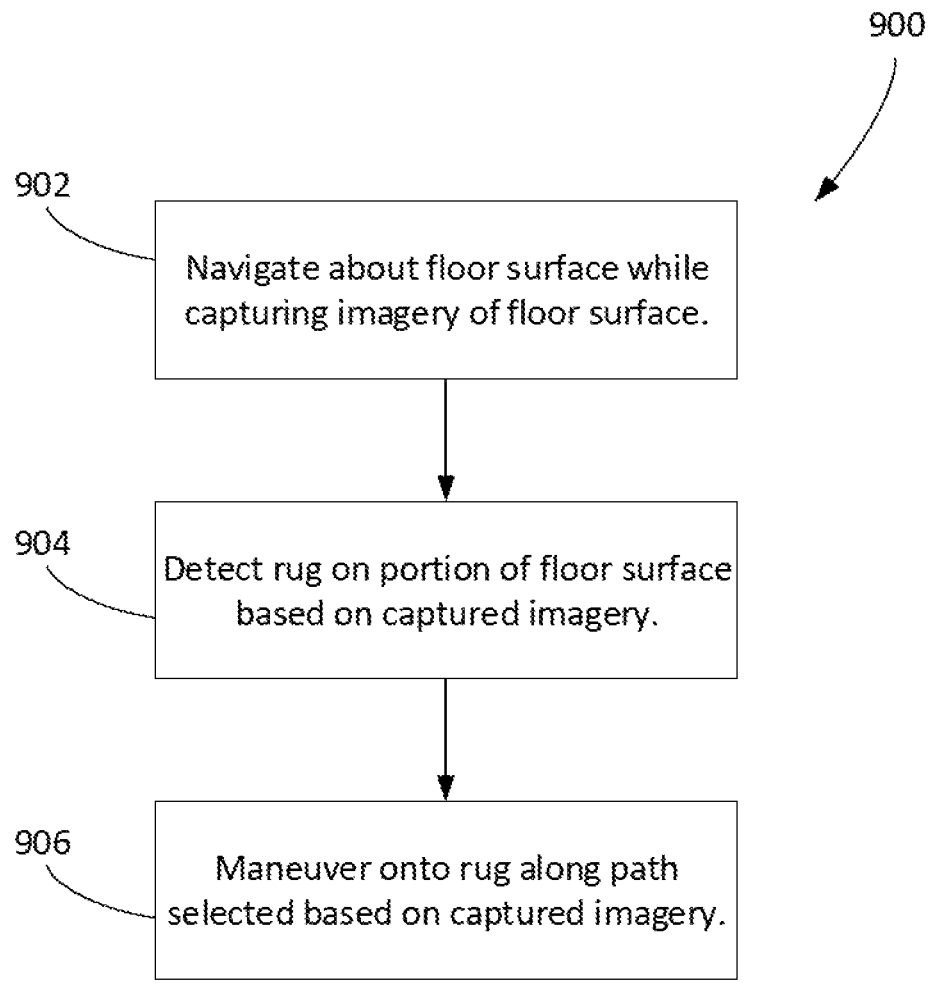
FIG. 9 is a flowchart of a method of controlling an autonomous cleaning robot for navigating relative to an area rug.

Referring to FIG. 9, a method 900 is performed by an autonomous mobile robot, e.g., the robot 100, to navigate the robot relative to an area rug in an environment. The method 900 can include steps 902, 904, and 906. The method 900 and its steps are described with respect to a robot 1000 shown in FIGS. 10A-10C. The robot 1000 is an autonomous cleaning robot similar to the robot 100, but in other implementations, other robots may be used.

At the step 902, referring also to FIG. 10A, the robot 1000 navigates about a floor surface 1004 of an environment 1002 while capturing imagery of the floor surface 1004, e.g., using an image capture device of the robot 1000 similar to the image capture device 101 of the robot 100 as described herein. The imagery captured by the image capture device can represent at least a portion of the floor surface 1004. The robot 1000, as described herein, can navigate using sensor data provided by a sensor system of the robot 1000, including imagery from the image capture device of the robot 1000. The robot 1000 can navigate about the floor surface 1004 during a cleaning mission. For example, the robot 1000 can perform a vacuuming mission to operate a vacuum system of the robot to vacuum debris on a floor surface of the environment 1002.

At the step 904, the robot 1000 detects a rug 1006 on a portion of the floor surface 1004 based on the imagery captured by the image capture device. The robot 1000 can detect the rug 1006 before moving over the rug 1006. By using the horizontally directed image capture device, the robot 1000 can detect objects and features ahead of the robot 1000 and can, in particular, detect the rug 1006.

At the step 906, after detecting the rug 1006, the robot 1000 maneuvers onto the rug 1006 along a path 1008 selected based on the imagery captured by the image capture device. The path 1008 can be selected to reduce a likelihood that the robot 1000 encounter an error condition as the robot 1000 moves from off of the rug 1006 and then onto the rug 1006. The imagery captured by the robot 1000 can be analyzed to identify the path 1008 to reduce the likelihood of an error condition. The imagery can include a plurality of images that are stitched together to form a stitched image representation produced like the way the stitched image representation described with respect to FIG. 6 is produced. The path 1008 can be determined based on the stitched image representation. Alternatively or additionally, the path 1008 can be determined based on the imagery captured by the robot 1000, including portions of the imagery that may not be formed into the stitched image representation. The imagery used by the robot 1000 to select the path 1008 could include multiple images captured by the robot 1000. The imagery or the stitched image representation can be indicative of locations of the corner portions 1010 and/or the tassels 1012 of the rug 1006. The imagery or the stitched image representation can also be indicative of a location of the rug 1006 relative to the robot 1000, a shape of the rug 1006, or other geometry of the rug 1006 can determined. The path 1008 can be selected such that the robot 1000 avoids moving over the corner portions 1010, or moving over the tassels 1012.

The error condition could be a stasis condition of a component of the robot 1000 in which a movable component of the robot 1000 is unable to move due to, for example, an object entrained in the movable component. The error condition could be, for example, a stasis condition of a rotatable member of the robot 1000 (e.g., similar to one of the rotatable members 118 of the robot 100), a stasis condition for a drive wheel of the robot 1000 (e.g., similar to one of the drive wheels 112 of the robot 100), or a stasis condition for a caster wheel of the robot 1000 (e.g., similar to the caster wheel 115 of the robot 100). A stasis condition for a movable component of the robot 1000 could occur as the robot 1000 moves from off of the rug 1006 to onto the rug 1006 if a portion of the rug 1006 impedes movement of the movable component. For example, certain geometries of the rug 1006 can become entrained in the rotatable members, the drive wheels, or the caster wheel of the robot 1000. In the example depicted in FIG. 10A, one of the corner portions 1010 of the rug 1006 can become entrained in the rotatable members, the drive wheels, or the caster wheel of the robot 1000. In addition, tassels 1012 of the rug 1006 can become entrained in one of these components.

To avoid the corner portions 1010 causing an error condition, the path 1008 onto the rug 1006 can be selected such that the robot 1000 avoids moving over the corner portions 1010. The corner portions 1010 correspond to locations on the rug 1006 where two edges, e.g., an edge 1014 and an edge 1016, meet one another at an angle. These corner portions 1010 can be susceptible to being entrained in a movable component of the robot 1000. The path 1008 can be selected such that a footprint of the robot 1000 does not move over any of the corner portions 1010 as the robot 1000 moves onto the rug 1006. In addition, the path 1008 can be selected such that a cleaning path, e.g., a path covered by the rotatable members of the robot 1000, does not extend over the corner portions 1010 as the robot 1000 moves onto the rug 1006, thereby reducing a risk that the robot 1000 ingests part of the corner portions 1010.

To avoid the tassels 1012 causing an error condition, the path 1008 onto the rug 1006 can be selected such that the robot 1000 avoids moving over the tassels 1012. The tassels 1012 of the rug 1006 can be thin and elongate fabric that can easily bend when the robot 1000 moves over the tassels 1012. Bases of the tassels 1012 are attached to the edge 1014 of the rug 1006, and the tassels 1012 extend across the floor surface 1004 from the edge 1014 outwardly away from a central portion of the rug 1006. The tassels 1012 can bend in response to friction between a bottom portion of the robot 1000 and the tassels 1012, and can, in some cases, be easily entrained by the rotatable members, the drive wheels, or the caster wheel of the robot 1000. To avoid a stasis condition for any of these components, in some implementations, when the robot 1000 moves from a location off of the rug 1006 to a location on the rug 1006, the robot 1000 moves across the edge 1016 of the rug 1006 that does not include the tassels 1012. The robot 1000 can avoid moving onto the rug 1006 across an edge 1016 that includes the tassels 1012 such that the tassels 1012 do not become entrained in movable components of the robot 1000.

In the example shown in FIG. 10A, the path 1008 includes a portion 1008a substantially perpendicular to the edge 1016. An angle between the portion 1008a of the path 1008 and the edge 1016 can be no more than 1 to 10 degrees, e.g., no more than 1 to 7 degrees, 1 to 5 degrees, or 1 to 3 degrees. In some implementations, the portion 1008a of the path 1008 intersects with the edge 1016 at a steeper angle, e.g., more than 1 to degrees. By moving along the portion 1008a of the path 1008, the robot 1000 can avoid stasis conditions caused by the rug 1006.

After the robot 1000 moves along the path 1008, referring to FIG. 10B, after the robot 1000 moves along a path 1018 to clean the rug 1006. In particular, the robot 1000 moves in a manner to cover a surface of the rug 1006 without moving off of the rug 1006. The path 1018 can have, for example, a cornrow pattern in which the robot 1000 moves along substantially parallel rows across the rug 1006 to clean the rug 1006. The path 1018 can be determined using methods similar to those used for determining the path 1008 of FIG. 10A, e.g., using the imagery captured by the robot 1000 or the stitched image representation produced from the imagery.

Referring to FIG. 10C, after the robot 1000 has cleaned the rug 1006, the robot 1000 can move along a path 1020 to move from a location on the rug 1006 to a location off of the rug 1006. The path 1020 can be selected to avoid error conditions triggered by the tassels 1012 or the corner portions 1010. In the example depicted in FIG. 10C, the path 1020 includes a portion 1020a that is perpendicular to the edge 1016, thereby allowing the robot 1000 to avoid encountering the tassels 1012 or the corner portions 1010. In some implementations, a region proximate to the tassels 1012 requires cleaning, and the robot 1000 may need to move over the tassels 1012 in order to clean this region. Rather than cleaning this region by moving from a location off of the rug 1006 to a location on the rug 1006, the robot 1000 can be maneuvered to move over the tassels 1012 only in a way that reduces a risk that the tassels 1012 are entrained in the movable components of the robot 1000. For example, the robot 1000 can be controlled to move along a path in which the robot 1000 only moves over the tassels 1012 if the robot 1000 is moving from a location on the rug 1006 to a location off of the rug 1006. In some implementations, the path 1020 is selected such that the robot 1000 moves over the tassels 1012 in a direction that is substantially parallel to a direction that the tassels 1012 extend from the edge 1016. For example, the direction that the robot 1000 moves and the direction that the tassels 1012 extend from the edge form an angle that is no more than 1 to 10 degrees, e.g., no more than 1 to 7 degrees, 1 to 5 degrees, or 1 to 3 degrees. If the robot 1000 moves over the tassels 1012 in this manner, the tassels 1012 tend not to bend and are less likely to become entrained in movable components of the robot 1000. The path 1020 can be determined using methods similar to those used for determining the path 1008 of FIG. 10A, e.g., using the imagery captured by the robot 1000 or the stitched image representation produced from the imagery.

Figure 11:
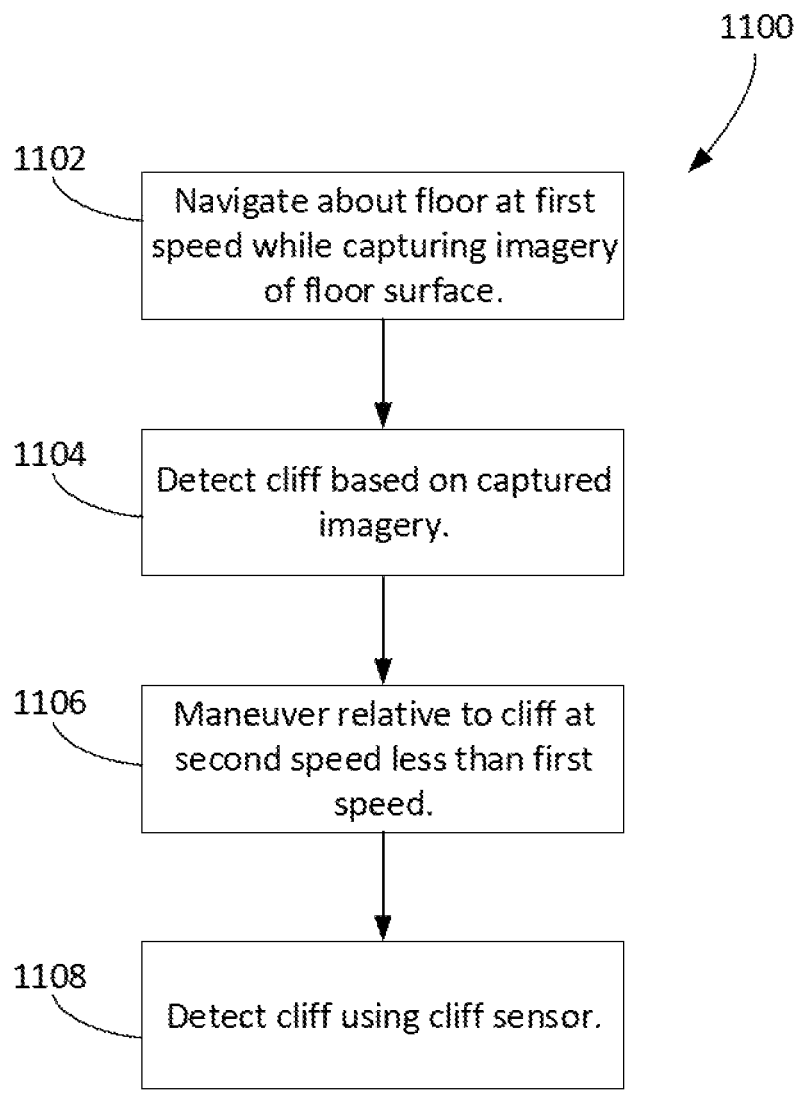
FIG. 11 is a flowchart of a method of maneuvering an autonomous cleaning robot relative to a portion of a floor surface having an elevation less than an elevation of the robot.

Referring to FIG. 11, a method 1100 is performed by an autonomous mobile robot, e.g., the robot 100, to navigate the robot relative to a lower portion of the floor surface that has a lower elevation than an upper portion of the floor surface along which the robot is moving. The lower portion and the upper portion of the floor surface form a cliff that the robot can avoid moving over in order to prevent fall damage to the robot. The method 1100 includes steps 1102, 1104, 1106, and 1108. The method 1100 and its steps are described with respect to a robot 1200 shown in FIG. 12. The robot 1200 is an autonomous cleaning robot similar to the robot 100, but in other implementations, other robots may be used. As described herein, the method 1100 allows the robot 1200 to detect a cliff before a cliff sensor of the robot 1200 can detect the cliff, and thus allows the robot 1200 to respond sooner to the presence of the cliff.

Figure 12:
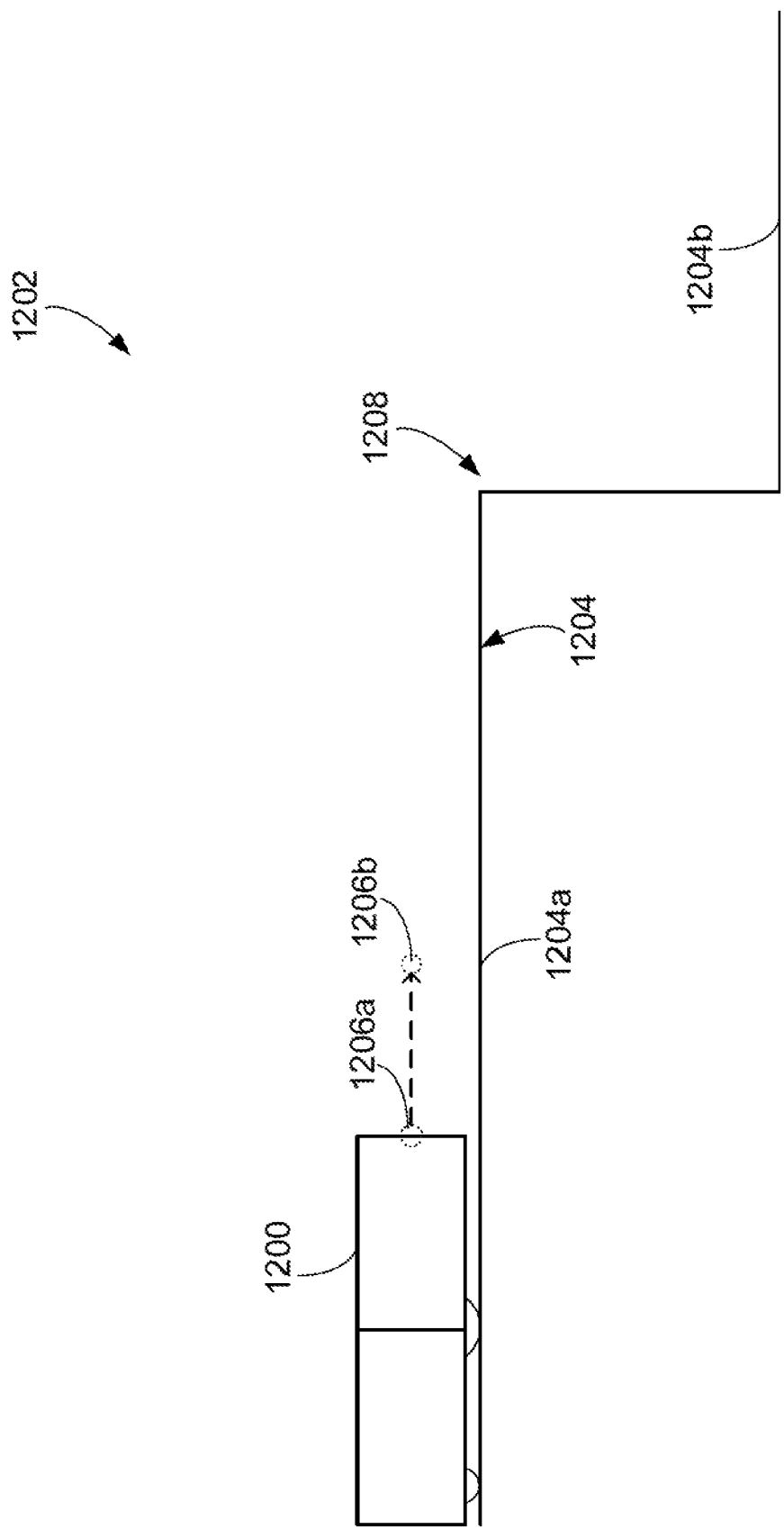
FIG. 12 is a side view of an autonomous cleaning robot approaching a portion of a floor surface having an elevation less than an elevation of the robot.

In the step 1102, referring also to FIG. 12, the robot 1200 navigates about a floor surface 1204 of an environment 1202 at a first speed while capturing imagery of the floor surface 1204, e.g., using an image capture device of the robot 1200 similar to the image capture device 101 of the robot 100 as described herein. The imagery captured by the image capture device can represent at least a portion of the floor surface 1204. The robot 1200, as described herein, can navigate using sensor data provided by a sensor system of the robot 1200, including imagery from the image capture device of the robot 1200. The robot 1200 can navigate about the floor surface 1204 during a cleaning mission. For example, the robot 1200 can perform a vacuuming mission to operate a vacuum system of the robot to vacuum debris on a floor surface of the environment 1002. The robot 1200 can move at the first speed from point 1206a to point 1206b. The first speed can correspond to a speed at which the robot 1200 moves across the floor surface 1204 in a coverage behavior or an obstacle following behavior. A speed of the robot 1200 can be reduced relative to the first speed in response to detection of a feature or object and initiation of a behavior to avoid the feature or object. For example, the robot 1200 may reduce its speed as the robot 1200 approaches the feature or object to avoid contacting the feature or object. The method 1100 illustrates an example in which the feature is a cliff.

At the step 1104, the robot 1200 detects a cliff based on the imagery captured at the step 1102. The cliff can correspond to a reduction in elevation of the floor surface 1204. For example, the robot 1200 is positioned on a first portion 1204a of the floor surface 1204 that is at a higher elevation than a second portion 1204b of the floor surface 1204. The first and second portions 1204a, 1204b form a cliff 1208. The robot 1200 could detect the cliff 1208 at, for example, the point 1206b. The cliff 1208 could be identified from the captured imagery. In some implementations, the cliff 1208 is identified in a portion of the captured imagery that is beyond a portion used for forming a stitched image representation. In some implementations, the cliff 1208 is identified in a portion of the captured imagery that is used to form the stitched image representation.

At the step 1106, the robot 1200 is maneuvered relative to the cliff 1208 at a second speed that is less than the first speed that the robot 1200 moved between the point 1206a and the point 1206b. For example, at the point 1206b, upon detecting the cliff 1208, the robot 1200 reduces its speed. The robot 1200 can reduce its speed from the first speed to the second speed and can make this speed reduction before the robot 1200 detects the cliff 1208 using a cliff sensor of the robot 1200 (e.g., similar to one of the cliff sensors 134 of the robot 100 as described herein).

In some implementations, at the step 1104, the robot 1200 can detect the cliff 1208, and at the step 1106, the robot 1200 reduces its speed only after the robot 1200 is within a distance from the cliff 1208. The distance between the robot 1200 and the cliff 1208 can be determined based on the captured imagery. The distance between the point 1206b and the cliff 1208 can be between 0.1 and 1 meter from the cliff 1208, e.g., between 0.1 and 0.7, 0.1 and 0.5, or 0.1 and 0.3 meters from the cliff 1208. The distance can be between 50% to 300% of a length of the robot 1200, e.g., between 50% and 250%, between 50% and 200%, or between 50% and 150% of the length of the robot 1200. The robot 1200 can initiate reduction to the second speed based on determining, from the imagery captured by the image capture device, the robot 1200 is no more than the distance from the cliff 1208.

At the step 1108, the robot 1200 detects the cliff 1208 using the cliff sensor of the robot 1200. The robot 1200 can detect the cliff 1208 when a portion of the robot 1200 is moved over the second portion 1204b of the floor surface 1204, thereby allowing the cliff sensor of the robot 1200 to detect an absence of an object below the portion of the robot 1200. Upon detecting the cliff 1208, the robot 1200 is maneuvered along the first portion 1204a of the floor surface 1204 away from the second portion 1204b of the floor surface, i.e., away from the cliff 1208. The robot 1200 can turn such that the robot 1200 moves away from the cliff 1208 or such that the robot 1200 moves along the cliff 1208.

Figure 13:
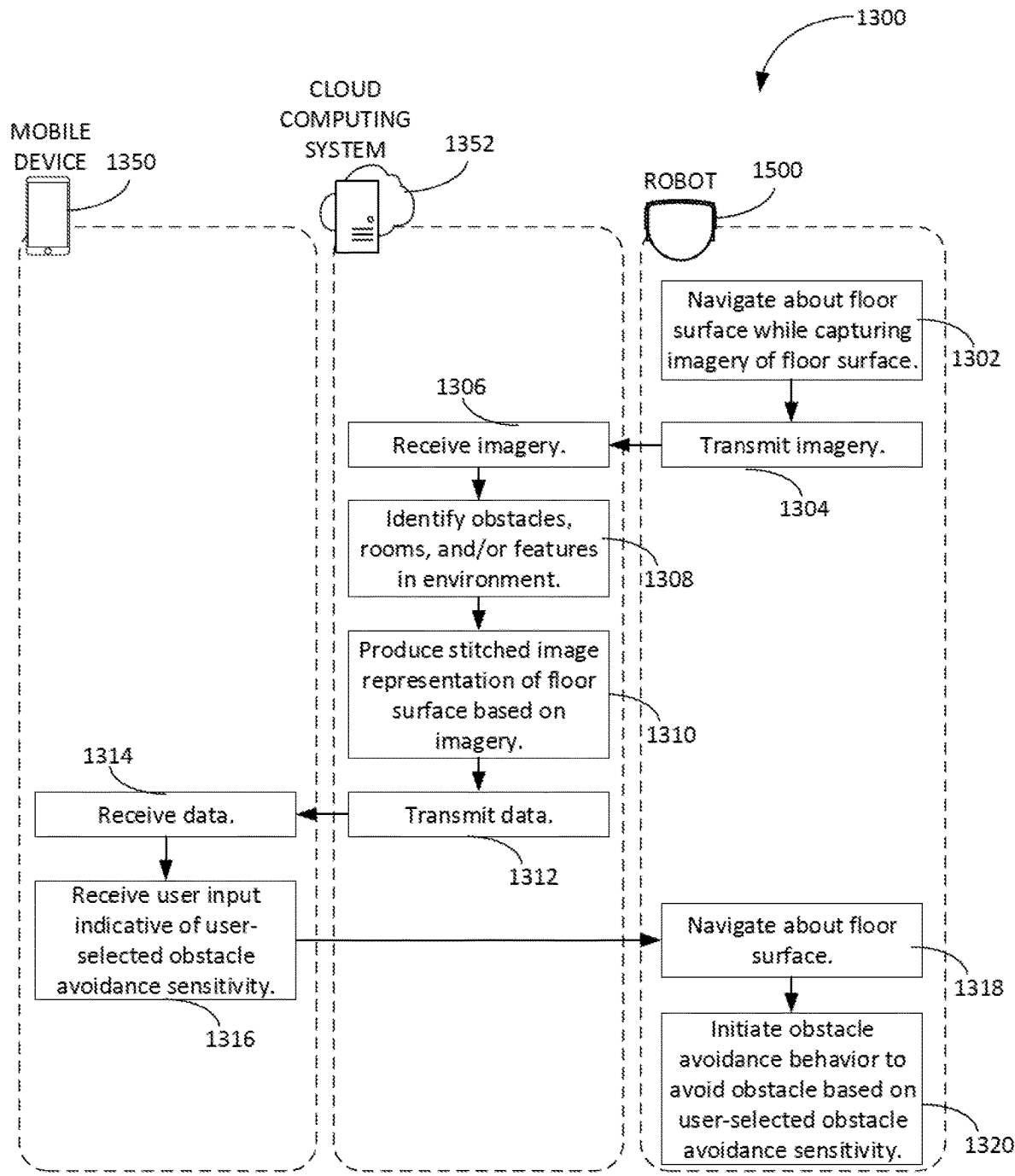
FIG. 13 is a flowchart of a method of controlling a sensitivity of an autonomous cleaning robot for obstacle avoidance.

Referring to FIG. 13, a method 1300 is used for controlling an obstacle avoidance sensitivity of a robot, e.g., the robot 100. As described herein, an autonomous mobile robot can include a sensor system with one or more electrical sensors. The sensors can be used to detect various objects and features in the environment, and these sensors, upon detecting an object or feature, can trigger avoidance behavior in which the robot avoids the object or feature. For example, the sensor can be a cliff sensor (e.g., one of the cliff sensors 134 of the robot 100), a proximity sensor (e.g., one of the proximity sensors 136a, 136b of the robot 100), or an image capture device (e.g., the image capture device 101 of the robot 100). The sensor can detect a particular feature (e.g., an obstacle such as a cliff, a wall, or other feature), and then the robot can be maneuvered to avoid the feature in response to the robot being sufficiently close to the feature. In some implementations, the robot initiates an obstacle avoidance behavior. In the obstacle avoidance behavior, the robot can reduce its speed when the robot is within a first distance from the obstacle, and then can turn away from the obstacle to avoid the obstacle when the robot is within a second distance from the obstacle.

Figure 14A:
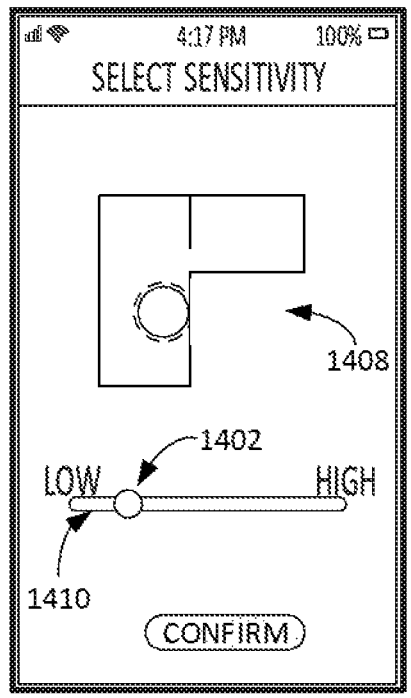
FIGS. 14A-14C are front views of a user computing device presenting a user interface for controlling a sensitivity of an autonomous cleaning robot for obstacle avoidance.
Figure 14B:
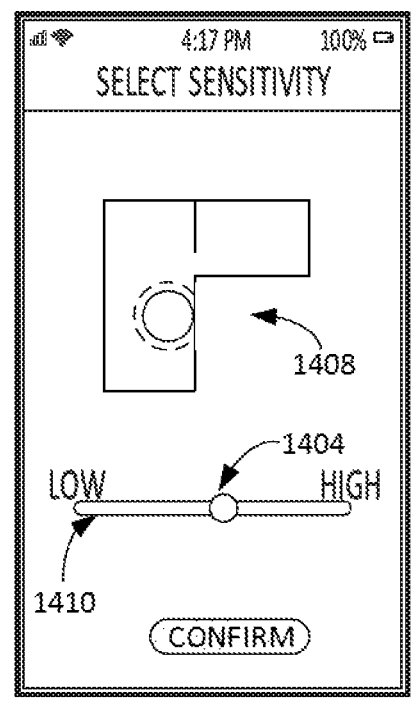
Figure 14C:
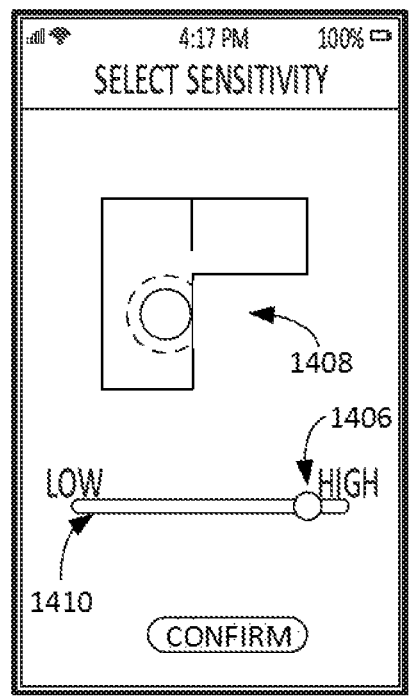

As described herein with respect to the method 1300, in some implementations, an obstacle avoidance sensitivity for the robot can be set, and the first distance and the second distance can vary depending on the set obstacle avoidance sensitivity. The method 1300 includes steps 1302, 1304, 1306, 1308, 1310, 1312, 1314, 1316, 1318, 1320. The method 1300 is described in connection with FIGS. 14A-14C showing a mobile device 1350 being used to set the obstacle avoidance sensitivity at different levels, and in connection with FIG. 15 showing a robot 1500 moving along a floor surface 1504 in an environment 1502 with an obstacle 1506.

Figure 15:
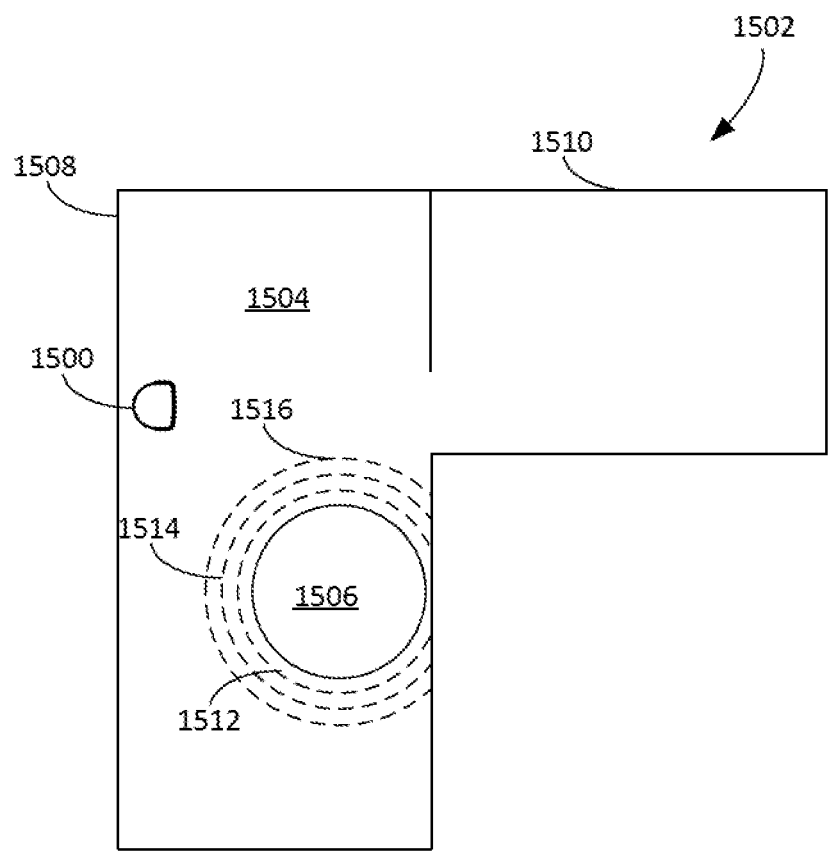
FIG. 15 is a top view of an autonomous cleaning robot in an environment in which a sensitivity of the robot for obstacle avoidance is controlled.

At the step 1302, referring also to FIG. 15, the robot 1500 navigates about the floor surface 1504 while capturing imagery of the floor surface 1504, e.g., using an image capture device of the robot 1500 similar to the image capture device 101 of the robot 100 as described herein. The imagery captured by the image capture device can represent at least a portion of the floor surface 1504. The robot 1500, as described herein, can navigate using sensor data provided by a sensor system of the robot 1500, including imagery from the image capture device of the robot 1500. The robot 1500 can navigate about the floor surface 1504 during a cleaning mission. For example, the robot 1500 can perform a vacuuming mission to operate a vacuum system of the robot to vacuum debris on a floor surface of the environment 1502. During the mission, the robot 1500 can detect an obstacle 1506 using the sensor system. The robot 1500 can detect the obstacle 1506 using the image capture device of the robot 1500, and/or using a bump sensor or a proximity sensor of the robot 1500.

At the step 1304, the robot 1500 transmits the captured imagery to a cloud computing system 1352, e.g., similar to the cloud computing system 192 described in connection with FIG. 5. The imagery can be transmitted during a mission performed by the robot 1500. Alternatively, the imagery can be transmitted at the end of the mission. At the step 1306, the cloud computing system 650 receives the imagery from the robot 1500.

At the step 1308, obstacles, rooms, and/or feature in the environment 1502 are identified. For example, the cloud computing system 1352 can identify the obstacle 1506, as well as rooms such as a room 1508 and a room 1510 in the environment 1502. The cloud computing system 1352 can identify locations of obstacles detected in the environment 1502, and can identify relative positions of rooms in the environment 1502. At the step 1310, a stitched image representation of the floor surface 1504 can be produced based on the imagery captured by the robot 1500. The stitched image representation can be produced like that described with respect to the step 608 in connection with FIG. 6.

At the step 1312, the cloud computing system 1352 transmits data indicative of the identified obstacles, rooms, and/or features in the environment 1502 and data indicative of the stitched image representation. At the step 1314, the mobile device 1350 receives the data indicative of the identified obstacles, rooms, and/or features in the environment 1502 and the data indicative of the stitched image representation. In some implementations, the steps 1308 and 1310 are performed by the robot 1500 rather than the cloud computing system 1352.

At the step 1316, referring also to FIGS. 14A-14C, the mobile device 1350 receives a user input indicative of a user-selected obstacle avoidance sensitivity. In the example shown in FIGS. 14A-14C, the mobile device 1350 is a mobile phone in which a user input element of the mobile device 1350 is a touchscreen, and a user output element is a display. The user can operate the touchscreen to provide a user input indicative of a user-selected obstacle avoidance sensitivity. FIGS. 14A-14C depict a low sensitivity selection 1402, a medium sensitivity selection 1404, and a high sensitivity selection 1406. In some implementations, user selections can be indicative of obstacle avoidance sensitivities for a particular obstacle. In the example depicted in FIGS. 14A-14C, the selections 1402, 1404, 1406 are indicative of obstacle avoidance sensitivities to the obstacle 1506.

The mobile device 1350 can present an indicator 1408 representing the obstacle 1506 (shown in FIG. 15), and can further present an indicator 1410 of a range of available sensitivities that the user could select. The indicator 1408 can be presented based on the imagery captured by the robot 1500. The indicator 1408 can include a representation of the obstacle 1506, and can also include a top view representation of the floor surface 1504. The indicator 1408 can a graphical representation of a top view of the environment 1502 and indicate a location of the obstacle 1506 in the environment 1502. The indicator 1408 can further visually represent the sensitivities for the corresponding selections 1402, 1404, 1406. For example, the indicator 1408 can visually represent these sensitivities by indicating different-sized zones around the obstacle 1506. In some implementations, the indicator 1408 can provide a representation of an image captured by the robot 1500, with the image representing at least a portion of the obstacle 1506.

A user can interact with the indicator 1410 to provide the selections 1402, 1404, 1406. For example, the indicator 1410 can represent a slider that the user can interact with to provide the selections 1402, 1404, 1406. In some implementations, the indicator 1410 can include a list of sensitivity levels, with the levels being selectable by the user to provide the selections 1402, 1404, 1406.

In some implementations, rather than being indicative of obstacle avoidance sensitivities for a particular obstacle, user selections can be indicative of obstacle avoidance sensitivities for a room. For example, the mobile device 1350 can present an indicator of a room, e.g., one of the rooms 1508, 1510, and provide an indicator of a range of available obstacle avoidance sensitivities that the user could select for the room. The user-selected obstacle avoidance sensitivity can correspond to a sensitivity to obstacles detected in the room. The user can interact with the mobile device to provide a selection indicative of user-selected obstacle avoidance sensitivity to obstacles in the room. In further implementations, user selections can be indicative of obstacle avoidance sensitivities for the environment 1502 as a whole. For example, a user-selected obstacle avoidance sensitivity can correspond to a sensitivity to obstacles detected in the environment 1502.

At the step 1318, the robot 1500 maneuvers about the floor surface 1504. The robot 1500 can maneuver about the floor surface 1504 during a mission of the robot 1500. This mission can be subsequent to the mission performed for the step 1302. At the step 1320, the robot 1500 initiates an avoidance behavior to avoid the obstacle 1506 based on the user-selected obstacle avoidance sensitivity. As the robot 1500 moves about the floor surface 1504, the robot 1500 can initiate the obstacle avoidance behavior to avoid the obstacle 1506 in response to detecting the obstacle 1506. The obstacle avoidance behavior can be initiated based on the user-selected obstacle avoidance sensitivity. In some implementations, the user-selected obstacle avoidance sensitivity can indicate a threshold for a distance between the robot 1500 and the obstacle 1506 at which the robot 1500 would initiate the obstacle avoidance behavior. For example, as depicted in FIG. 15, distance thresholds 1512, 1514, 1516 correspond to the selections 1402, 1404, 1406, respectively. The robot 1500 initiates the obstacle avoidance behavior based on a distance between the obstacle 1506 and the robot 1500 being no more than the distance threshold 1512, 1514, 1516. The selections 1402, 1404, 1406, referring briefly back to FIGS. 14A-14C, can be user selections of distances.

The selection 1402 can correspond to a distance between 0 and 15 centimeters, e.g., between 1 and 5 centimeters, between 1 and 10 centimeters, between 1 and 15 centimeters, less than 1 centimeter, at least 1 centimeter, at least 3 centimeters, at least 5 centimeters, etc. The selection 1404 can correspond to a distance between 3 and 30 centimeters, e.g., between 5 and 15 centimeters, between 5 and 20 centimeters, between 5 and 25 centimeters, at least 3 centimeters, at least 5 centimeters, at least 7 centimeters, or at least 10 centimeters, etc. The selection 1406 can correspond to a distance between 5 and 60 centimeters, e.g., between 10 and 30 centimeters, between 20 and 40 centimeters, between 30 and 50 centimeters, between 40 and 60 centimeters, at least 5 centimeters, at least 7 centimeters, at least 10 centimeters, etc.

In some implementations, the user-selected obstacle avoidance sensitivity represents a likelihood threshold that the obstacle 1506 is present on a portion of the floor surface 1504. As the robot 1500 moves about the floor surface 1504, the robot 1500 can determine a likelihood that the obstacle 1506 is proximate to the robot 1500, or is ahead of the robot 1500. The likelihood can be determined based on sensor data from the current mission that the robot 1500 is performing, as well as based on sensor data from one or more previously performed missions. For example, the obstacle 1506 can be detected in a previously performed mission, such as the mission described with respect to the step 1302. In addition, the likelihood can be determined based on a mobility of the obstacle 1506. For example, the obstacle 1506 can have a high mobility, such as a cord, clothing, or other obstacle that is likely to be picked up by a user and placed elsewhere or removed from the floor surface 1504. If the obstacle 1506 has high mobility and is detected in a first mission, the likelihood that the obstacle 1506 is present in a second mission could be low. The obstacle 1506, alternatively, can have a low mobility, such as a table or a couch. If the obstacle 1506 has low mobility and is detected in a first mission, the likelihood that the obstacle 1506 is present in a second mission could be high.

In some implementations, rather than being user-selected sensitivity, the sensitivity can be automatically selected, for example, by the robot 1500 or the cloud computing system 1352. The sensitivity to an obstacle can be selected based on whether the robot 1500, in one or more previous missions, experienced an error condition near the obstacle. After the robot 1500 has initially detected the obstacle, subsequent missions in which the robot 1500 does not detect the obstacle can reduce the sensitivity of the robot 1500 to the obstacle. In some implementations, the indicator 1410 can indicate the automatically-selected sensitivity, and then the user can interact with the indicator 1410 to change the sensitivity.

Additional Alternative Implementations

A number of implementations have been described. Other implementations are possible.

While some implementations are described with respect to a single autonomous mobile robot, e.g., the robot 100, the robot 700, the robot 1000, the robot 1200, and the robot 1500, in some implementations, data from multiple autonomous mobile robots operating in the environment can be used. For example, the imagery captured by the robot 100 can be used in combination with sensor data generated by the robot 190 described with respect to FIG. 5 to form a user-facing map or to control navigation of the robot 100 or the robot 190. In some implementations, the robot 190 can also have a front facing image capture device similar to the image capture device 101 of the robot 100. The image capture device of the robot 190 can capture imagery that can be used in combination with the imagery captured by the robot 100 to generate a stitched image representation of a floor surface.

The image capture device 101, as described herein, can be a single image capture device of the robot 100. In some implementations, the robot 100 can include two or more front-facing image capture devices, and imagery from the two or more front-facing image capture devices can be used for the methods described herein.

The image capture device 101, as described herein, can be horizontally directed in the forward direction F of the robot 100. In some implementations, the image capture device 101 is angled relative to a horizontal axis. For example, the image capture device 101 can be angled downward at an angle between 5 and 30 degrees, e.g., between 5 and 25 degrees, 5 and 20 degrees, or 5 and 15 degrees.

The method 900 depicted in FIG. 9 is described in connection with the rug 1006 depicted in FIGS. 10A-10C. The method 900 can be used with rugs having other geometries. For example, non-rectangular rugs could include multiple protruding portions. In some cases, a rug could include non-linear geometry along an edge due to a rip. The method 900 could be implemented to avoid the portion including the non-linear geometry.

Referring to FIGS. 10A-10C, the robot 1000 is described as avoiding moving onto the rug 1006 across the edge 1016 that includes the tassels 1012 such that the tassels 1012 do not become entrained in movable components of the robot 1000. In some implementations, the robot 1000 can move along a path that moves over the tassels 1012. In such implementations, the robot 1000 can reduce a speed of rotation of the rotatable members of the robot 1000 as the robot 1000 moves over the tassels 1012. The robot 1000 can reduce a speed of rotation of the rotatable members when the robot 1000 is at a location off of the rug 1006 and before the robot 1000 moves onto the rug 1006. In this regard, the robot 1000 can rotate the rotatable member at a first speed of rotation as the robot 1000 moves about a portion of the floor surface 1004 off of the rug 1006, and then rotate the rotatable member a second speed of rotation as the robot 1000 moves from the portion of the floor surface 1004 off of the rug 1006 to a portion of the floor surface 1004 on the rug 1006, with the second speed of rotation being less than the first speed of rotation. In some implementations, the robot 1000 reduces the speed of rotation by deactivating a drive system that drives the rotatable members of the robot 1000 such that the rotatable members no longer rotate. In some implementations, the robot 1000 reduces an amount of power delivered to the drive system for the rotatable members.

After the robot 1000 is on the rug 1006 and is beyond the edges of the rug 1006, the robot 1000 can increase the speed of rotation of the rotatable member. The robot 1000 can drive the rotatable member to rotate at a third speed of rotation. The third speed of rotation can be the same as or similar to the first speed of rotation. In some implementations, the third speed of rotation is greater than the second speed of rotation and less than the first speed of rotation. The robot 1000 can reactivate the drive system after the robot 1000 moves beyond the edges of the rug 1006 or beyond the tassels 1012 into an interior of the rug 1006. The robot 1000 can be controlled to move over tassels in examples in which tassels surround an interior of a rug 1006. For example, tassels can be positioned along an entire perimeter of the rug. As the robot 1000 moves off of the rug 1006, the robot 1000 can operate the drive system of the rotatable members so that the rotatable members rotate as the robot 1000 moves over the edges of the rug 1006 or the tassels 1012 of the rug 1006. This allows the robot 1000 to clean a region along a perimeter of the rug 1006. The robot 1000 can drive the rotatable members at a fourth speed of rotation. In some implementations, the fourth speed of rotation is the same as the third speed of rotation. In some implementations, the fourth speed of rotation is greater than the second speed of rotation.

Objects and obstacles represented in these images as described herein can be overlaid on this three-dimensional representation, thereby accurately depicting placement of doors and windows in the environment 20. Alternatively or additionally, machine learning techniques can be used to detect distances of objects from the robot 700 that appear in a single image captured by the robot 700. Based on these distances, a three-dimensional representation can be generated to be presented to the user on the mobile device 652.

Figure 16A:
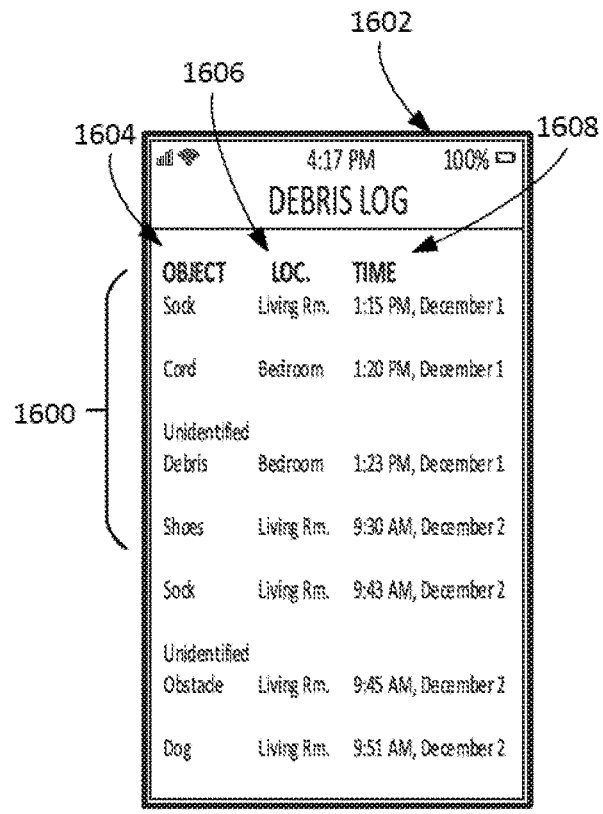
FIGS. 16A-16B are front views of a user computing device presenting an object log and presenting a representation of an objected detected in an environment of an autonomous cleaning robot, respectively.
Figure 16B:
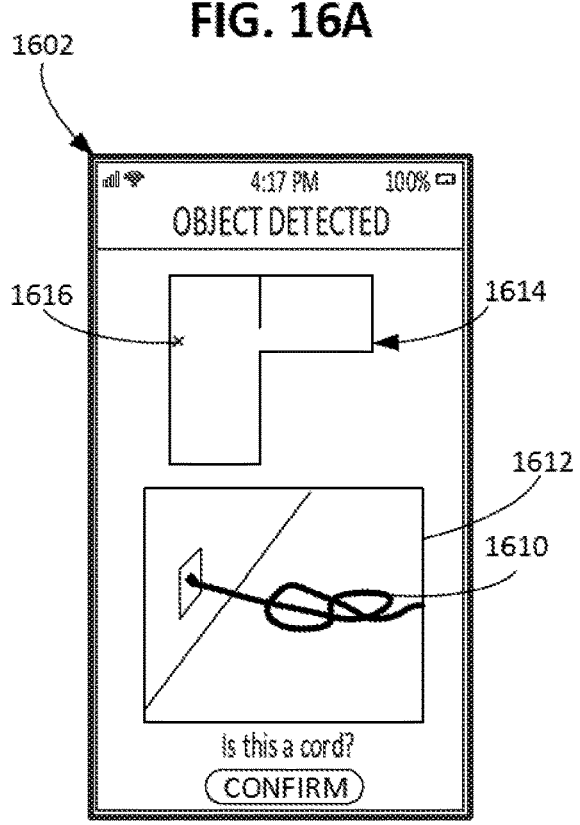

As described herein, objects and obstacles can be represented in images captured by the robot 700 and can be overlaid on a three-dimensional representation. In some implementations, referring to FIG. 16A, a list 1600 of objects, including debris, obstacles, or other objects, encountered by an autonomous cleaning robot (e.g., similar to the robot 700) can be presented to a user through a mobile device 1602 (e.g., similar to the mobile device 652 described herein). The list 1600 can identify a name 1604 of an object, a location 1606 of the object, and a time 1608 that the object was encountered by the robot. Referring to FIG. 16B, the mobile device 1602 can, for example, present a representation of an object encountered by the robot. In the example depicted in FIG. 16B, the object is a cord 1610. The representation of the object can be generated based on the imagery captured by the robot. The representation of the object can be generated based on a representation of the object in imagery captured by the robot 700. In some examples, the representation of the object presented on the mobile device 1602 can correspond to a portion of the imagery captured by the robot. Alternatively or additionally, the object can be identified from the imagery of the robot, and then a computer-generated image or a stock image can be presented as part of the logged object presented to the user through the mobile device 1602. For example, the robot can encounter different types of objects during a mission. The robot can capture imagery of objects ingested by the robot or encountered by the robot during the mission. Portions of the captured imagery representing the object can be presented by the mobile device 1602, e.g., the cord 1610 shown in FIG. 16B, or the object can be identified using the imagery and then representations of the object can be presented on the mobile device 1602.

A representation of the object can be presented on the mobile device 1602, and the mobile device 1602 can issue a request for the user to confirm the identity of the object. For example, if the object is the cord 1610, the mobile device 1602 can present the representation of the cord 1610 and ask the user to confirm that the object is a cord. In some implementations, the mobile device 1602 can provide a list of types of objects detected and/or ingested by the robot 700, and in some implementations, the mobile device 1602 can provide indicators, e.g., overlaid on the stitched image representation of the floor surface described herein, of locations of the objects detected and/or ingested by the robot. For example, as shown in FIG. 16B, in addition to presenting imagery 1612 representing the cord 1610, the mobile device 1602 can present a top view representation 1614 of an environment of the robot, and can provide an indicator 1616 overlaid on the representation 1614 to indicate the location where the cord 1610 was encountered. The mobile device 1602 can identify the object as the cord 1610 and request that the user confirm that the object is indeed the cord 1610. By identifying the object and presenting the indicator 1616 of the location of the object, the mobile device 1602 can allow a user to easily tidy up a room so that the robot can avoid the object in a future mission.

The method 1100 depicted in FIG. 11 is described in connection with the cliff 1208 depicted in FIG. 12. In some implementations, the method 1100 can be used for avoiding steep drop-offs in the environment 1202, e.g., floor surfaces that form an angle greater than 45 degrees relative to a horizontal plane.

In some implementations, rather than decreasing its speed as it approaches a feature in the environment, an autonomous cleaning robot can increase its speed in response to detecting a feature. For example, referring to FIG. 17, an autonomous cleaning robot 1700 can navigate about a floor surface 1702 at a first speed while capturing imagery of the floor surface 1702. The robot 1700 can detect a raised portion 1704 of the floor surface 1702, e.g., in a doorway or between different rooms, based on the captured imagery. The robot 1200 can estimate a distance between it and the raised portion 1704 and increase its speed in response to being within a certain distance from the raised portion 1704. For example, the robot 1700 moves at a first speed between a point 1706a and a point 1706b, and then increases its speed at the point 1706b in response to determining that it is within the distance from the raised portion 1704. From the point 1706b until the robot 1700 reaches the threshold and moves over the raised portion 1704, the robot 1700 travels at a second speed greater than the first speed. This increased speed allows the robot 1700 to more easily travel over the raised portion 1704 without getting stuck on the raised portion 1704.

While an autonomous cleaning robot has been described herein, other mobile robots may be used in some implementations. For example, the robot 100 is a vacuum cleaning robot. In some implementations, an autonomous wet cleaning robot can be used. The robot can include a pad attachable to a bottom of the robot, and can be used to perform cleaning missions in which the robot scrubs the floor surface. The robot can include systems similar to those described with respect to the robot 100. In some implementations, a patrol robot with an image capture device can be used. The patrol robot can include mechanisms to move the image capture device relative to a body of the patrol robot. While the robot 100 is described as a circular robot, in other implementations, the robot 100 can be a robot including a front portion that is substantially rectangular and a rear portion that is substantially semicircular. In some implementations, the robot 100 has an outer perimeter that is substantially rectangular.

Nevertheless, it will be understood that various modifications may be made. Accordingly, other implementations are within the scope of the claims.

What is claimed is:

1. A mobile computing device comprising:
a user input device;
a controller operably connected to the user input device, the controller configured to execute instructions to perform operations comprising:
receiving, from the user input device, data indicative of a user-selected sensitivity for obstacle avoidance by an autonomous cleaning robot, and
initiating transmission of the data indicative of the user-selected sensitivity to the autonomous cleaning robot such that the autonomous cleaning robot initiates an obstacle avoidance behavior to avoid an obstacle on a portion of a floor surface based on imagery captured by an image capture device of the autonomous cleaning robot and the user-selected sensitivity.

2. The mobile computing device of claim 1, wherein the user-selected sensitivity is indicative of a distance threshold such that the autonomous cleaning robot initiates the obstacle avoidance behavior based on a distance between the obstacle and the autonomous cleaning robot being no more than the distance threshold.

3. The mobile computing device of claim 2, wherein receiving the user-selected sensitivity comprises receiving data indicative of a user selection of the distance threshold.

4. The mobile computing device of claim 1, wherein the user-selected sensitivity is indicative of a likelihood threshold such that the autonomous cleaning robot initiates the obstacle avoidance behavior based on a likelihood of a presence of the obstacle on the portion of the floor surface being no less than the likelihood threshold.

5. The mobile computing device of claim 4, wherein the likelihood of the presence of the obstacle is determined based on the imagery captured by the image capture device.

6. The mobile computing device of claim 1, further comprising a display operably connected to the controller,
wherein the obstacle is represented in the imagery captured by the image capture device, and
wherein the operations comprise:
receiving, from the autonomous cleaning robot, data representative of the imagery, and
presenting, on the display, a representation of the obstacle based on the data representative of the imagery.

7. The mobile computing device of claim 1, further comprising a display operably connected to the controller,
wherein the operations comprise:
presenting, on the display, representations of a plurality of obstacles present in imagery by the image capture device of the autonomous cleaning robot, the representations of the plurality of obstacles comprising a representation of the obstacle.

8. An autonomous cleaning robot comprising:
a drive system to support the autonomous cleaning robot above a floor surface, the drive system being operable to maneuver the autonomous cleaning robot about the floor surface;
an image capture device positioned on the autonomous cleaning robot to capture imagery of a portion of the floor surface forward of the autonomous cleaning robot; and
a controller operably connected to the drive system and the image capture device, wherein the controller is configured to execute instructions to perform operations comprising initiating, based on a user-selected sensitivity and the imagery captured by the image capture device, an avoidance behavior to avoid an obstacle on the portion of the floor surface.

9. The autonomous cleaning robot of claim 8, wherein the user-selected sensitivity corresponds to a user-selected distance threshold, and initiating the avoidance behavior to avoid the obstacle comprises initiating the avoidance behavior based on a distance between the obstacle and the autonomous cleaning robot being no more than the distance threshold.

10. The autonomous cleaning robot of claim 8, wherein the user-selected sensitivity corresponds to a likelihood threshold, and initiating the avoidance behavior to avoid the obstacle comprises initiating the avoidance behavior based on a likelihood of a presence of the obstacle on the portion of the floor surface being no less than the likelihood threshold.

11. The autonomous cleaning robot of claim 8, wherein the operations comprise initiating transmission of data indicative of a plurality of images captured by the image capture device to cause a remote user device to present representations of a plurality of obstacles present in the plurality of images.

12. An autonomous cleaning robot comprising:
a drive system to support the autonomous cleaning robot above a floor surface, the drive system being operable to maneuver the autonomous cleaning robot about the floor surface;
an image capture device positioned on the autonomous cleaning robot to capture imagery of a portion of the floor surface forward of the autonomous cleaning robot, the portion of the floor surface comprising at least a portion of a rug; and
a controller operably connected to the drive system and the image capture device, wherein the controller is configured to execute instructions to perform operations comprising maneuvering the autonomous cleaning robot onto the rug along a path selected based on the imagery of the portion of the floor surface.

13. The autonomous cleaning robot of claim 12, wherein:
the imagery of the portion of the floor surface is indicative of a location of a tassel of the rug, and
maneuvering the autonomous cleaning robot onto the rug comprises maneuvering the autonomous cleaning robot onto the rug along the path such that the autonomous cleaning robot avoids the tassel.

14. The autonomous cleaning robot of claim 12, wherein:
the path is a first path,
the imagery of the portion of the floor surface is indicative of a direction along which a tassel of the rug extends along the floor surface, and
the operations further comprise maneuvering the autonomous cleaning robot off of the rug along a second path such that the autonomous cleaning robot moves over the tassel in a direction substantially parallel to the direction along which the tassel extends.

15. The autonomous cleaning robot of claim 12, wherein:
the imagery of the portion of the floor surface is indicative of a location of a corner of the rug, and
maneuvering the autonomous cleaning robot onto the rug comprises maneuvering the autonomous cleaning robot onto the rug along the path such that the autonomous cleaning robot avoids the corner of the rug.

16. The autonomous cleaning robot of claim 12, wherein:
the imagery comprises a plurality of images, and
maneuvering the autonomous cleaning robot onto the rug along a path selected based on the imagery of the portion of the floor surface comprises maneuvering the autonomous cleaning robot onto the rug along the path selected based on a location of an edge of the rug represented in the plurality of images.

17. The autonomous cleaning robot of claim 16, wherein maneuvering the autonomous cleaning robot onto the rug along the path selected based on the location of the edge of the rug represented in the plurality of images comprises maneuvering the autonomous cleaning robot onto the rug along the path selected based on a stitched image representation of the floor surface generated from the plurality of images.

18. The autonomous cleaning robot of claim 12, further comprising:
- a rotatable member on a bottom portion of the autonomous cleaning robot; and
- a motor to rotate the rotatable member to direct debris into an interior of the autonomous cleaning robot,
- wherein the operations further comprise:
  - operating the motor to rotate the rotatable member at a first speed of rotation as the autonomous cleaning robot moves about a portion of the floor surface off of the rug, and
  - operating the motor to rotate the rotatable member at a second speed of rotation as the autonomous cleaning robot moves from the portion of the floor surface off of the rug to a portion of the floor surface on the rug, the second speed of rotation being less than the first speed of rotation.

19. The autonomous cleaning robot of claim 18, wherein the second speed of rotation is zero.

20. The autonomous cleaning robot of claim 18, wherein the operations further comprise:
- operating the motor to rotate the rotatable member at third speed of rotation as the autonomous cleaning robot moves about the rug, the third speed of rotation being greater than the second speed of rotation, and
- operating the motor to rotate the rotatable member at a fourth speed of rotation as the autonomous cleaning robot moves from the portion of the floor surface on the rug to the portion of the floor surface on the rug, the fourth speed of rotation being greater than the second speed of rotation.

* * * * *